(12) United States Patent
Maruyama et al.

(10) Patent No.: US 11,505,711 B2
(45) Date of Patent: Nov. 22, 2022

(54) INK JET RECORDING APPARATUS, INK JET RECORDING METHOD, AND INK COMPOSITION

(71) Applicant: Seiko Epson Corporation, Tokyo (JP)

(72) Inventors: Tomoki Maruyama, Matsumoto (JP); Yusuke Mizutaki, Shiojiri (JP); Tomohiro Aruga, Matsumoto (JP); Kiyomi Kumamoto, Shiojiri (JP); Jun Ito, Shimosuwa (JP)

(73) Assignee: SEIKO EPSON CORPORATION

( * ) Notice: Subject to any disclaimer, the term of this patent is extended or adjusted under 35 U.S.C. 154(b) by 0 days.

(21) Appl. No.: 17/035,965

(22) Filed: Sep. 29, 2020

(65) Prior Publication Data

US 2021/0095146 A1     Apr. 1, 2021

(30) Foreign Application Priority Data

Sep. 30, 2019 (JP) ............................. JP2019-179754

(51) Int. Cl.
*C09D 11/322* (2014.01)
*B41J 2/21* (2006.01)
(Continued)

(52) U.S. Cl.
CPC .............. *C09D 11/322* (2013.01); *B41J 2/14* (2013.01); *B41J 2/175* (2013.01); *B41J 2/2107* (2013.01);
(Continued)

(58) Field of Classification Search
CPC .... B41J 2/17566; B41J 2/17513; B41J 2/175; B41J 2/17553; B41J 2/2107; B41J 2/14;
(Continued)

(56) References Cited

U.S. PATENT DOCUMENTS 5,619,239 A    4/1997 Kotaki et al.
5,745,137 A    4/1998 Scheffelin et al.
(Continued)

FOREIGN PATENT DOCUMENTS

CN    1107103 A      8/1995
CN    102205727 A    10/2011
(Continued)

OTHER PUBLICATIONS

Sep. 29, 2020, Jun Ito et al.
(Continued)

*Primary Examiner* — An H Do
(74) *Attorney, Agent, or Firm* — Harness, Dickey & Pierce, P.L.C.

(57) ABSTRACT

An ink jet recording apparatus includes an ink composition, an ink encasement in which the ink composition is encased, a recording head that ejects the ink composition, and a carriage configured to move the recording head back and forth. The carriage carries the ink encasement, with the ink encasement integrated with the carriage. The ink encasement has an ink fill port that opens and shuts as a port through which the ink composition is loaded. The ink composition contains a water-soluble dye and a polyhydric alcohol with a normal boiling point of 270° C. or above, with the percentage of the polyhydric alcohol being 26.0% by mass or less of the total amount of the ink composition.

7 Claims, 3 Drawing Sheets

(51) Int. Cl.
  *C09D 11/40* (2014.01)
  *B41J 2/175* (2006.01)
  *B41J 2/14* (2006.01)

(52) U.S. Cl.
  CPC ..... *C09D 11/40* (2013.01); *B41J 2002/14403* (2013.01)

(58) Field of Classification Search
  CPC ................ B41J 2/17563; B41J 2/17509; B41J 2002/14403; C09D 11/328; C09D 11/38; C09D 11/40; C09D 11/322
  See application file for complete search history.

(56) References Cited

U.S. PATENT DOCUMENTS

| | | | |
|---|---|---|---|
| 5,746,818 A | 5/1998 | Yatake | |
| 6,070,974 A | 6/2000 | Kotaki et al. | |
| 6,145,975 A | 11/2000 | Kotaki et al. | |
| 6,164,772 A | 12/2000 | Koitabashi et al. | |
| 6,243,116 B1 | 6/2001 | Kotaki et al. | |
| 6,505,923 B1 | 1/2003 | Yamamoto et al. | |
| 6,767,075 B1 | 7/2004 | Takada et al. | |
| 6,969,161 B2 | 11/2005 | Kuwabara et al. | |
| 9,067,417 B2* | 6/2015 | Komatsu ............... | B41J 2/16552 |
| 2002/0140750 A1 | 10/2002 | Yoshiyama et al. | |
| 2003/0083396 A1 | 5/2003 | Ylitalo et al. | |
| 2005/0012798 A1 | 1/2005 | Adachi et al. | |
| 2006/0203055 A1 | 9/2006 | Doi | |
| 2007/0146454 A1 | 6/2007 | Doi et al. | |
| 2007/0188571 A1 | 8/2007 | Tokita et al. | |
| 2007/0263054 A1 | 11/2007 | Yatake et al. | |
| 2010/0068389 A1* | 3/2010 | Ohzeki ................ | C09D 11/54 427/256 |
| 2010/0302326 A1 | 12/2010 | Morohoshi et al. | |
| 2011/0228629 A1 | 9/2011 | Kawate | |
| 2011/0242206 A1 | 10/2011 | Komatsu et al. | |
| 2012/0249667 A1 | 10/2012 | Hirata et al. | |
| 2012/0293590 A1 | 11/2012 | Yoshida et al. | |
| 2013/0044168 A1 | 2/2013 | Kaga et al. | |
| 2013/0114084 A1 | 5/2013 | Kamiyanagi et al. | |
| 2013/0155160 A1 | 6/2013 | Shiono | |
| 2013/0182057 A1 | 7/2013 | Koase | |
| 2014/0036010 A1 | 2/2014 | Hasegawa et al. | |
| 2014/0084578 A1* | 3/2014 | Yagi ..................... | C09B 31/153 283/72 |
| 2014/0125743 A1 | 5/2014 | Aruga | |
| 2014/0240391 A1 | 8/2014 | Goto et al. | |
| 2015/0085034 A1 | 3/2015 | Aruga et al. | |
| 2016/0040022 A1 | 2/2016 | Aruga et al. | |
| 2016/0177116 A1 | 6/2016 | Katsuragi et al. | |
| 2016/0333211 A1 | 11/2016 | Miyajima | |
| 2018/0187034 A1 | 7/2018 | Takeno et al. | |
| 2018/0215160 A1 | 8/2018 | Koike et al. | |
| 2019/0023926 A1 | 1/2019 | Kumamoto et al. | |
| 2019/0105903 A1 | 4/2019 | Kimura et al. | |
| 2020/0207136 A1* | 7/2020 | Miyasa ................ | D06P 1/5271 |
| 2020/0361220 A1 | 11/2020 | Kumagai et al. | |

FOREIGN PATENT DOCUMENTS

| | | |
|---|---|---|
| CN | 102794992 A | 11/2012 |
| CN | 103173059 A | 6/2013 |
| CN | 103804992 A | 5/2014 |
| CN | 104245860 A | 12/2014 |
| JP | 2019-019220 A | 2/2019 |
| JP | 2019-069550 A | 5/2019 |

OTHER PUBLICATIONS

Sep. 29, 2020, Kiyomi Kumamoto et al.
Sep. 29, 2020, Tomohiro Aruga et al.
Sep. 29, 2020, Yusuke Miutaki et al.

* cited by examiner

INK JET RECORDING APPARATUS, INK JET RECORDING METHOD, AND INK COMPOSITION

The present application is based on, and claims priority from JP Application Serial Number 2019-179754, filed Sep. 30, 2019, the disclosure of which is hereby incorporated by reference herein in its entirety.

BACKGROUND

1. Technical Field

The present disclosure relates to an ink jet recording apparatus, an ink jet recording method, and an ink composition.

2. Related Art

In the field of relatively small ink jet recording apparatuses, such as those for household and office use, there is a demand for increasing the capacity of an ink encasement from which ink is supplied to a recording head and for reducing the overall body size.

Known serial ink jet recording apparatuses use a cartridge, which is of small capacity, or an ink tank, which provides a larger capacity, as a container from which an ink composition is supplied to a recording head. A cartridge is a container that is mounted on a carriage (mechanism that moves a recording head back and forth) together with a recording head, and the user can detach the cartridge from the carriage and attach it again. Cartridges, however, require frequent replacement because of their small capacity. Refilling them with an ink composition also involves careful manipulation.

To address this, JP-A-2019-019220, for example, proposes a large-capacity ink tank. Increasing the capacity of an ink tank helps reduce the frequency of replacement and refilling.

A large ink tank, however, is difficult to mount on a carriage. Instead, it supplies the ink composition therein to a recording head through a tube or similar pathway. When the tube is long, the ink can dry during its transfer from the ink tank to the recording head. Increasing the capacity of an ink tank therefore helps reduce the frequency of refilling, but at the same time can cause unstable ejection as a result of accumulated evaporation of water due to reduced refilling.

SUMMARY

A form of an ink jet recording apparatus according to an aspect of the present disclosure includes an ink composition, an ink encasement in which the ink composition is encased, a recording head that ejects the ink composition, and a carriage configured to move the recording head back and forth. The carriage carries the ink encasement, with the ink encasement integrated with the carriage. The ink encasement has an ink fill port that opens and shuts as a port through which the ink composition is loaded. The ink composition contains a water-soluble dye. The ink composition contains a polyhydric alcohol with a normal boiling point of 270° C. or above, with a percentage thereof being 26.0% by mass or less of a total amount of the ink composition.

In the above form of an ink jet recording apparatus, the percentage of the polyhydric alcohol with a normal boiling point of 270° C. or above to the total amount of the ink composition may be 1.0% by mass or more.

In any of the above forms of ink jet recording apparatuses, the ink composition may further contain a polyoxyalkylene alkyl ether compound.

In any of the above forms of ink jet recording apparatuses, the ink encasement may have a filter, and the ink composition may pass through the filter against force of gravity when flowing from the ink encasement to the recording head.

In any of the above forms of ink jet recording apparatuses, the carriage may further carry a disperse-colorant ink encasement, in which a disperse-colorant ink composition is encased, as an extra ink encasement, and the recording head may eject the disperse-colorant ink composition and the ink composition.

A form of an ink jet recording method according to an aspect of the present disclosure is a recording method in which an ink jet recording apparatus is used that includes an ink composition, an ink encasement in which the ink composition is encased, a recording head that ejects the ink composition, and a carriage configured to move the recording head back and forth. The carriage carries the ink encasement, with the ink encasement integrated with the carriage. The ink encasement has an ink fill port that opens and shuts as a port through which the ink composition is loaded. The ink composition contains a water-soluble dye. The ink composition contains a polyhydric alcohol with a normal boiling point of 270° C. or above, with a percentage thereof being 26.0% by mass or less of a total amount of the ink composition. The method includes ejecting the ink composition from the recording head to attach the ink composition to a recording medium.

A form of an ink composition according to an aspect of the present disclosure contains a water-soluble dye and a polyhydric alcohol with a normal boiling point of 270° C. or above, with a percentage of the polyhydric alcohol being 26.0% by mass or less of a total amount of the ink composition. The ink composition is for use with an ink jet recording apparatus that includes the ink composition, an ink encasement in which the ink composition is encased, a recording head that ejects the ink composition, and a carriage configured to move the recording head back and forth. The carriage carries the ink encasement, with the ink encasement integrated with the carriage. The ink encasement has an ink fill port that opens and shuts as a port through which the ink composition is loaded.

DESCRIPTION OF EXEMPLARY EMBODIMENTS

Figure 1:
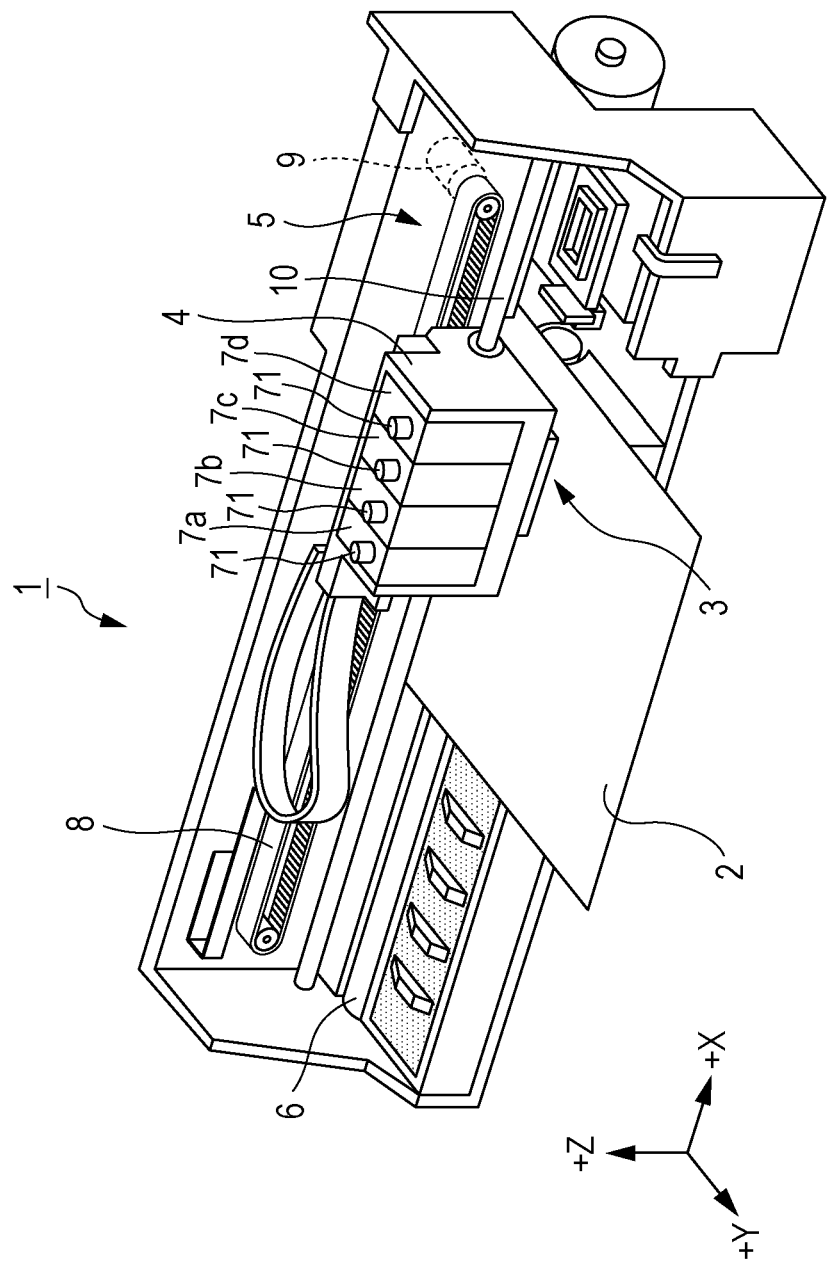
FIG. 1 is an outline perspective diagram illustrating an example of an ink jet recording apparatus according to an embodiment.

The following describes embodiments of the present disclosure. The following embodiments are descriptions of examples of the disclosure. The disclosure is never limited to these embodiments and includes variations implemented within the gist of the disclosure. Not all the configurations described below are essential for the disclosure.

1. Ink Jet Recording Apparatus

An ink jet recording apparatus according to this embodiment includes an ink composition, an ink encasement in which the ink composition is encased, a recording head that ejects the ink composition, and a carriage configured to move the recording head back and forth.

1.1. Ink Composition

As a component of the ink jet recording apparatus according to this embodiment, the ink composition contains a water-soluble dye and a polyhydric alcohol with a normal boiling point of 270° C. or above. The percentage of the polyhydric alcohol is 26.0% by mass or less of the total amount of the ink composition.

1.1.1. Water-Soluble Dye

Any water-soluble dye can be contained in the ink composition according to this embodiment. Acidic dyes, direct dyes, reactive dyes, and basic dyes can be used. Examples include C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C.I. Food Black 1 and 2, C.I. Direct Yellow 1, 12, 24, 33, 50, 55, 58, 86, 132, 142, 144, and 173, C.I. Direct Red 1, 4, 9, 80, 81, 132, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, 141, and 249, and C.I. Reactive Black 3, 4, and 35.

Other examples include at least one selected from the compound represented by formula (y-1) below or its salt

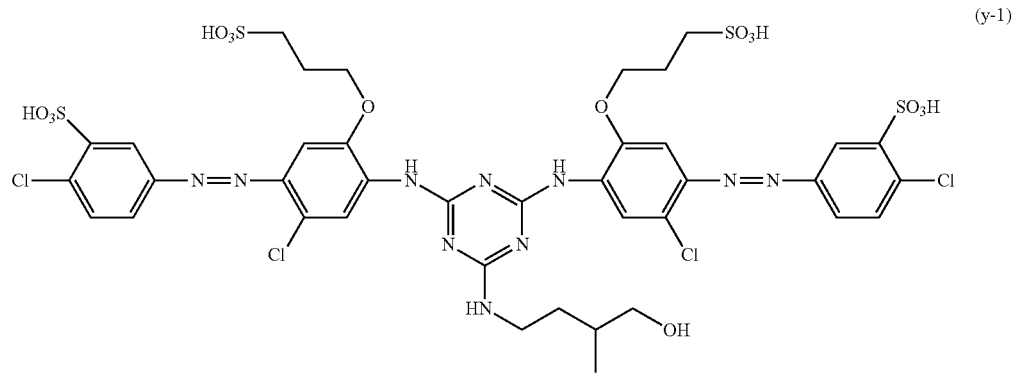 [SMILES: CC(CO)CCNc1nc(Nc2cc(Cl)c(N=Nc3ccc(Cl)c(S(=O)(=O)O)c3)cc2OCCCS(=O)(=O)O)nc(Nc2cc(Cl)c(N=Nc3ccc(Cl)c(S(=O)(=O)O)c3)cc2OCCCS(=O)(=O)O)n1]

(In formula (y-1), each of the four sulfonic acid groups may independently be in the sulfonate form. Examples of counterions in a salt of the compound represented by formula (y-1) include the hydrogen (proton), lithium, sodium, potassium, and ammonium ions, and the counterion may be of the same or different species between the four sulfonic acid groups.), the compound represented by formula (y-2) below or its salt

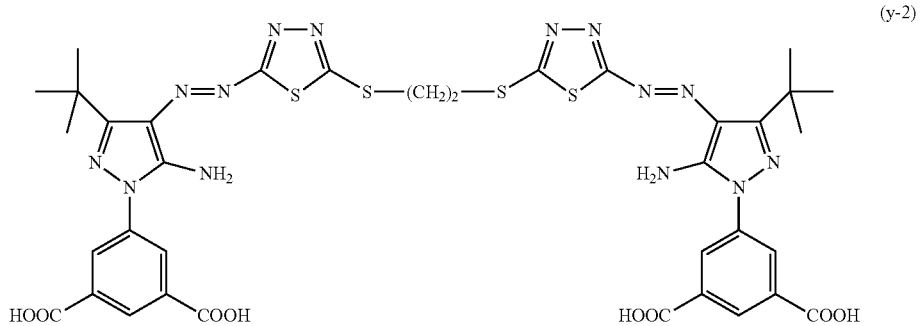

(In formula (y-2), each of the four carboxy groups may independently be in the carboxylate form. Examples of counterions in a salt of the compound represented by formula (y-2) include the hydrogen (proton), lithium, sodium, potassium, and ammonium ions, and the counterion may be of the same or different species between the four carboxy groups.), the compound represented by formula (y-3) below or its salt

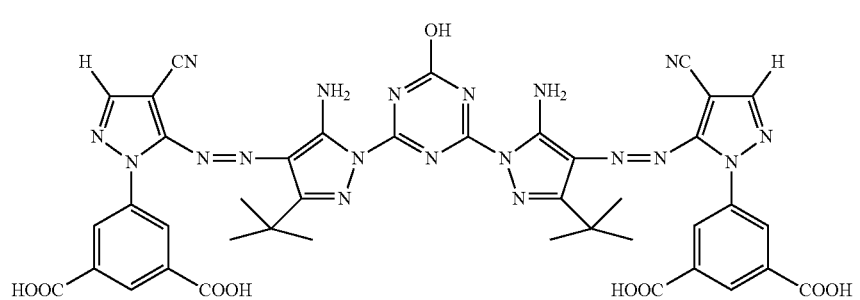

(y-3)

(In formula (y-3), each of the four carboxy groups may independently be in the carboxylate form. Examples of counterions in a salt of the compound represented by formula (y-3) include the hydrogen (proton), lithium, sodium, potassium, and ammonium ions, and the counterion may be of the same or different species between the four carboxy groups.), the compound represented by formula (y-4) below or its salt,

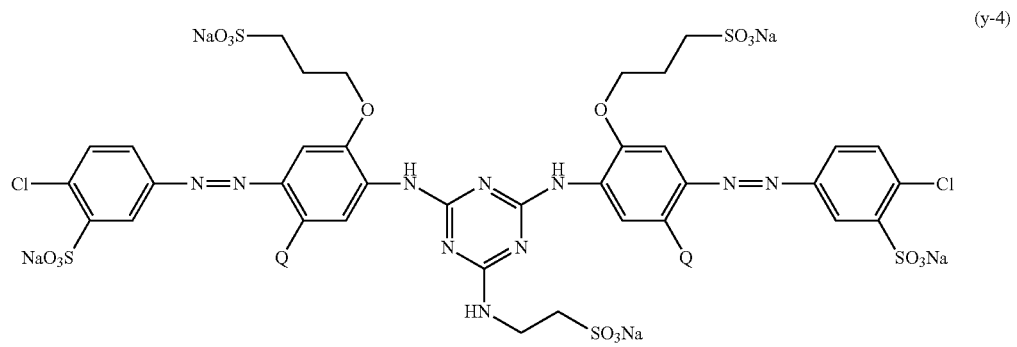

(y-4)

the compound represented by formula (y-5) below or its salt,

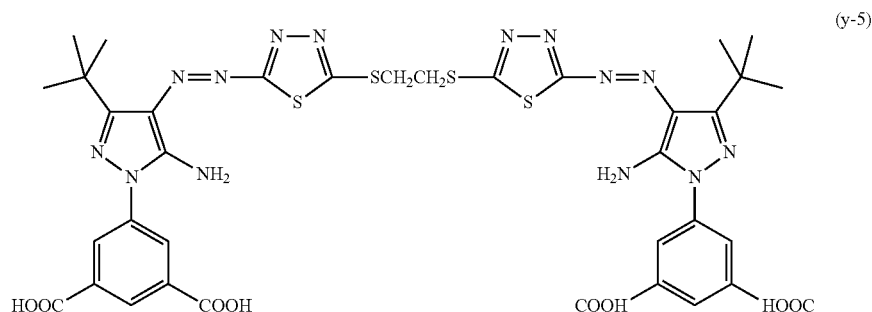

(y-5)

the compound represented by formula (m-1) below or its salt

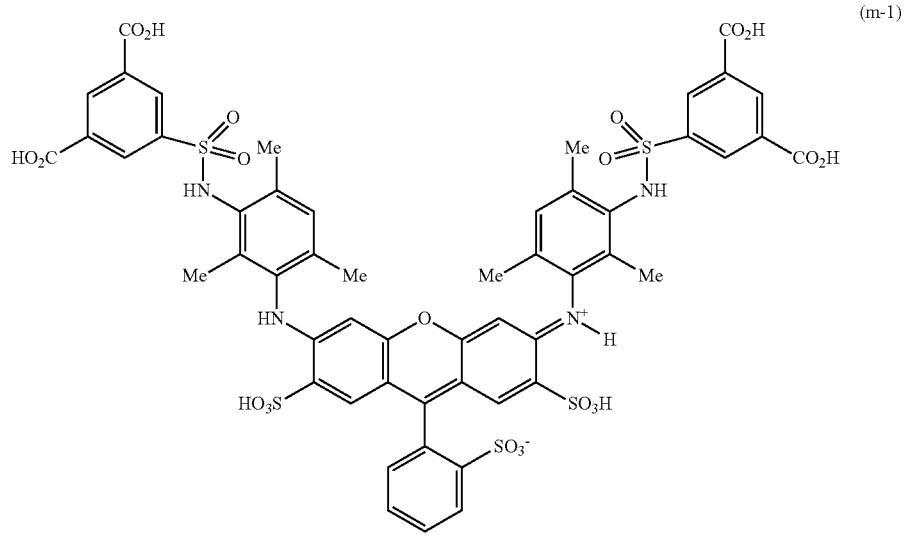

(m-1)

(Examples of counterions in a salt of the compound represented by formula (m-1) include the hydrogen (proton), lithium, sodium, potassium, and ammonium ions, and the counterion may be of the same or different species between the four carboxy and two sulfonic acid groups.), the compound represented by formula (m-2) below or its salt

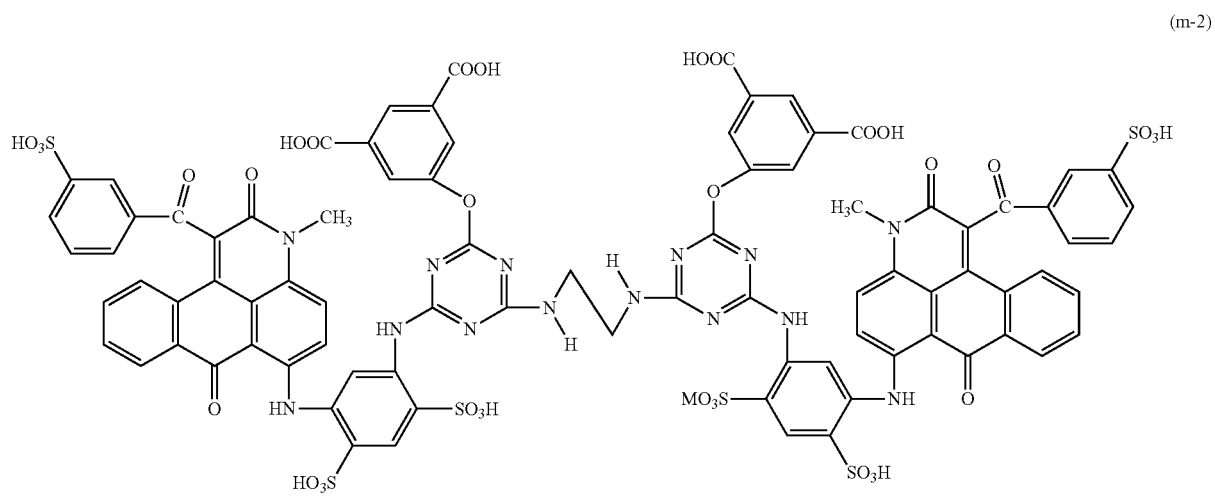

(m-2)

(Examples of counterions in a salt of the compound represented by formula (m-2) include the hydrogen (proton), lithium, sodium, potassium, and ammonium ions, and the counterion may be of the same or different species between the four carboxy and six sulfonic acid groups.), a compound represented by formula (m-3) below or its salt

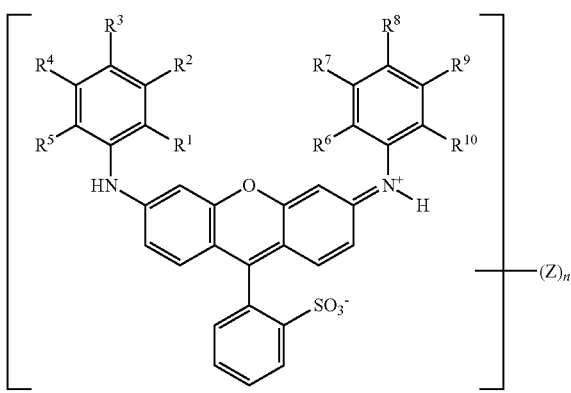

(m-3)

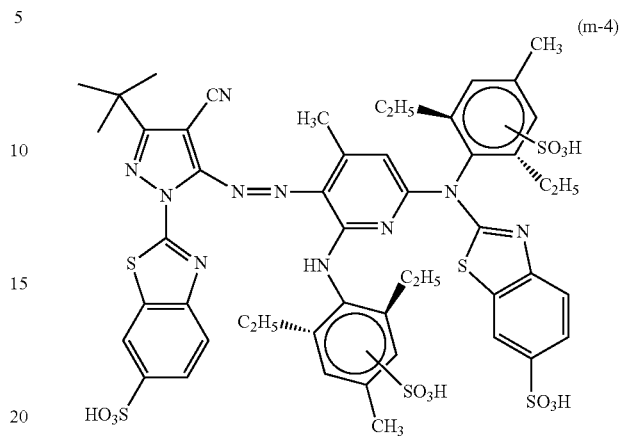

(m-4)

(In formula (m-3), $R^1$, $R^5$, $R^6$, and $R^{10}$ each independently represent an alkyl group. $R^3$ and $R^8$ each independently represent a hydrogen atom or alkyl, alkoxy, or aryloxy group. An alkyl, alkoxy, or aryloxy group may have at least one type of substituent selected from the group of substituents consisting of the alkyl, aryl, arylalkyl, hydroxyl, carbamoyl, sulfamoyl, alkoxy, and cyano groups, halogens, and ionic groups. $R^2$, $R^4$, $R^7$, and $R^9$ each independently represent a hydrogen atom or an acylamino group represented by formula (m-3') below, with at least one of $R^2$, $R^4$, $R^7$, and $R^9$ being an acylamino group represented by formula (m-3') below. Z represents a $SO_3H$, $SO_3M$ (where M represents an ammonium ion or alkali metal ion), or sulfamoyl group. n represents an integer of 0 to 3 when at least one of $R^2$, $R^3$, $R^4$, $R^7$, $R^8$, and $R^9$ is substituted with an ionic group, and an integer of 1 to 3 when not. Z, when present, is in place of at least one aromatic hydrogen atom.)

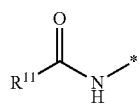

(m-3')

(In formula (m-3'), $R^{11}$ represents an alkyl, cycloalkyl, aryl, arylalkyl, alkenyl, or heterocyclic group. The alkyl, cycloalkyl, aryl, arylalkyl, alkenyl, or heterocyclic group may have at least one type of substituent selected from the group of substituents consisting of the alkyl, aryl, arylalkyl, alkenyl, alkoxy, cyano, alkylamino, sulfoalkyl, carbamoyl, sulfamoyl, and sulfonylamino groups, halogens, and ionic groups. * represents a site for binding with the aromatic ring in formula (m-3).) (Examples of counterions in a salt of a compound represented by formula (m-3) include the hydrogen (proton), lithium, sodium, potassium, and ammonium ions.), the compound represented by formula (m-4) below or its salt (Examples of counterions in a salt of the compound represented by formula (m-4) include the hydrogen (proton), lithium, sodium, potassium, and ammonium ions, and the counterion may be of the same or different species between the four sulfonic acid groups.), a compound represented by formula (m-5) below or its salt

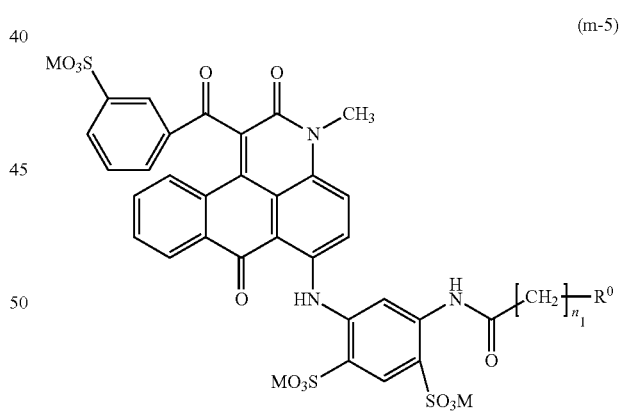

(m-5)

(In formula (m-5), $n_1$ is 1 or 2, each of the three Ms is sodium or ammonium, the three Ms may be the same or different, and $R^0$ is a C1 to C8 monoalkylamino group substituted with a carboxy group.), a compound represented by formula (c-1) below or its salt

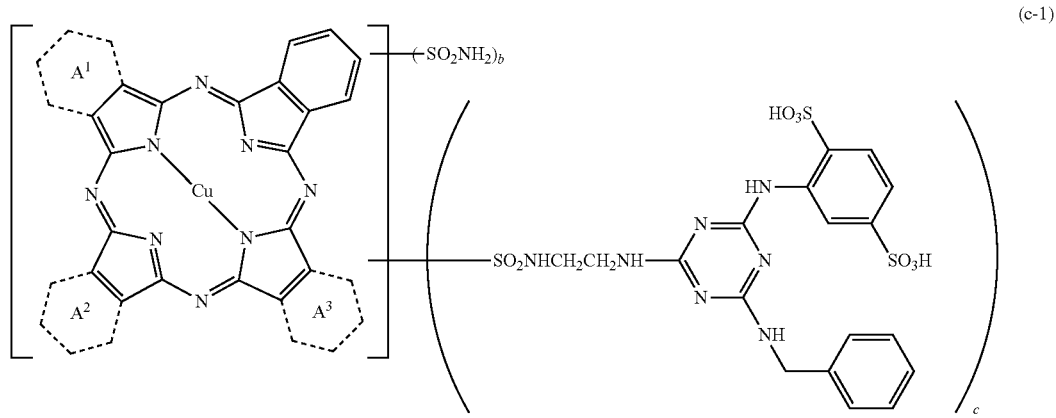

(In formula (c-1), $0 \leq b \leq 4$, $0 \leq c \leq 4$, and $1 \leq (b+c) \leq 4$, where b+c is an integer. Rings $A^1$, $A^2$, and $A^3$ are each selected from the benzene, 2,3-pyridine, and 3,2-pyridine rings, with at least one of rings $A^1$, $A^2$, and $A^3$ being a 2,3-pyridine or 3,2-pyridine ring. Rings $A^1$, $A^2$, and $A^3$ may be the same or different.) (Examples of counterions in a salt of a compound represented by formula (c-1) include the hydrogen (proton), lithium, sodium, potassium, and ammonium ions, and the counterion may be of the same or different species between the sulfonic acid groups.), the compound represented by formula (c-2) below or its salt

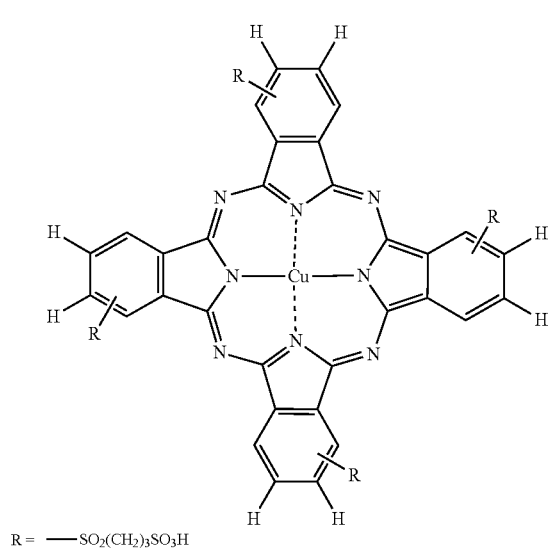

(Examples of counterions in a salt of the compound represented by formula (c-2) include the hydrogen (proton), lithium, sodium, potassium, and ammonium ions, and the counterion may be of the same or different species between the four sulfonic groups.), the compound represented by formula (c-3) below or its salt

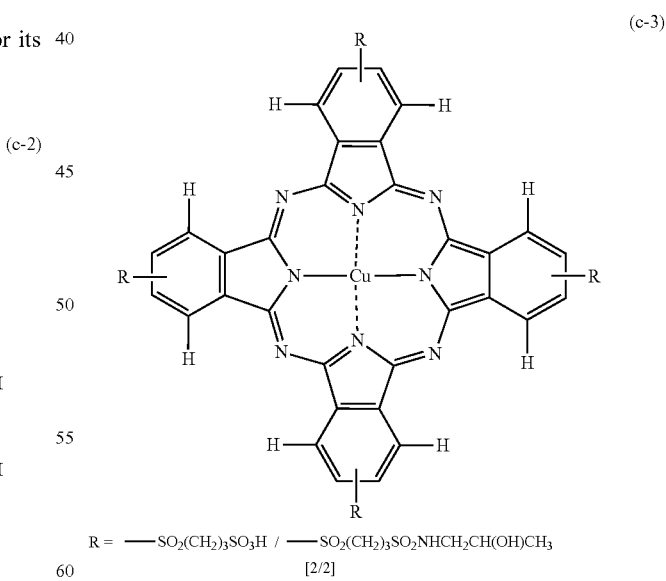

(Examples of counterions in a salt of the compound represented by formula (c-3) include the hydrogen (proton), lithium, sodium, potassium, and ammonium ions, and the counterion may be of the same or different species between the two sulfonic acid groups.), a compound represented by formula (c-4) below or its salt

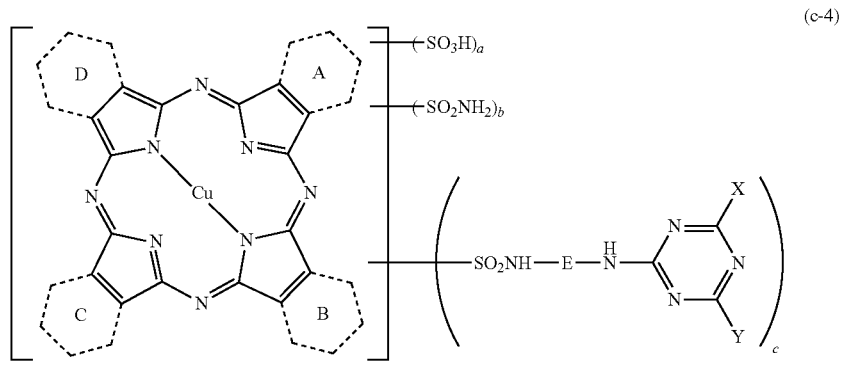

(c-4)

(In formula (c-4), each of rings A, B, C, and D is independently an aromatic six-membered ring, with at least one of rings A, B, C, and D being a pyridine or pyrazine ring. E is an alkylene group. X is a sulfo-, carboxy-, or phosphono-substituted anilino group that may further have one to four substituents of type(s) selected from the group consisting of the sulfonic acid, carboxy, phosphono, sulfamoyl, carbamoyl, hydroxy, alkoxy, amino, alkylamino, dialkylamino, arylamino, diarylamino, acetylamino, ureido, alkyl, nitro, and cyano groups, halogens, and alkylsulfonyl and alkylthio groups. Y is a hydroxy or amino group. $1.0 \leq a \leq 2.0$, $0.0 \leq b \leq 3.0$, $0.1 \leq c \leq 3.0$, and $1.0 \leq a+b+c \leq 4.0$.) (Examples of counterions in a salt of a compound represented by formula (c-4) include the hydrogen (proton), lithium, sodium, potassium, and ammonium ions.), the compound represented by formula (c-5) below or its salt

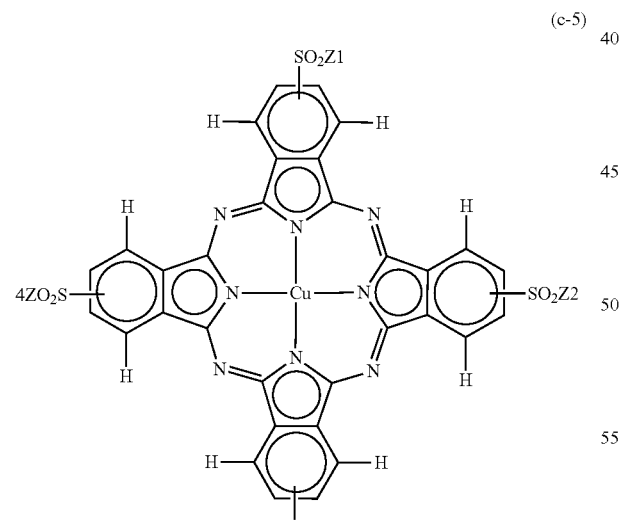

(c-5)

$Z1 = Z2 = Z3 = $ ——$(CH_2)_3SO_3H$
$Z4 = $ ——$(CH_2)_3SO_2NHCH_2CH(OH)CH_3$ (Examples of counterions in a salt of the compound represented by formula (c-5) include the hydrogen (proton), lithium, sodium, potassium, and ammonium ions, and the counterion may be of the same or different species between the three sulfonic acid groups.), and a compound represented by formula (c-6) or its salt

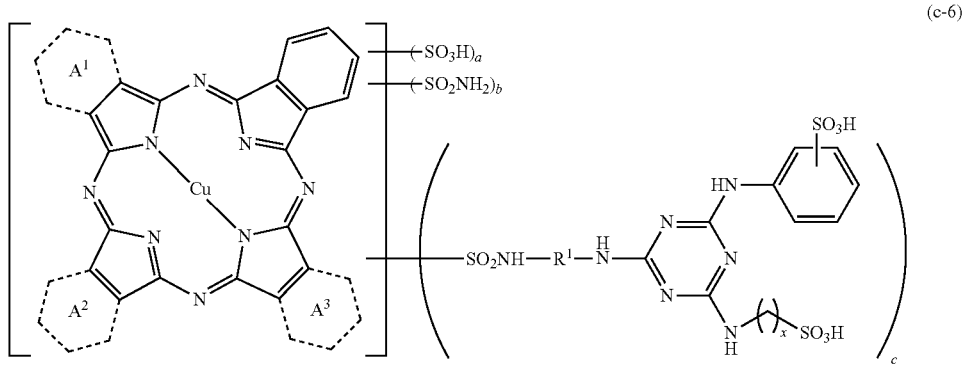

(In formula (c-6), rings $A^1$, $A^2$, and $A^3$ are each selected from the benzene, 2,3-pyridine, and 3,2-pyridine rings, with at least one of rings $A^1$, $A^2$, and $A^3$ being a 2,3-pyridine or 3,2-pyridine ring, and rings $A^1$, $A^2$, and $A^3$ may be the same or different. $1.0 \leq a \leq 3.0$, $0.2 \leq b \leq 1.8$, $0.8 \leq c \leq 1.6$, and $0 \leq a+b+c \leq 4$. $1 \leq x \leq 3$, where x is an integer. $R^1$ is a C1 to C6 linear alkylene group.).

One such water-soluble dye may be used alone, or two or more may be used in combination.

Preferably, the total water-soluble dye content is 1% by mass or more and 20% by mass or less of the total mass (100% by mass) of the ink composition. The ink composition may be a clear composition (clear ink), which is colorant-free or contains so small an amount of colorant that the purpose of its use is no longer coloring (e.g., 0.1% by mass or less).

Water-soluble dyes do not easily aggregate compared with other, water-insoluble colorants (e.g., pigments and disperse dyes) even after the ink composition loses its water because of evaporation. The ink encasement of the ink jet recording apparatus according to this embodiment has an ink fill port that opens and shuts as a port through which through which the ink composition is loaded. The ink encasement is refilled through this port while in use, which means water can evaporate over time depending on the degree of closure of the fill port. The use of water-soluble dye(s) helps prevent the formation of aggregates effectively even when water evaporates out through the fill port.

1.1.2. Polyhydric Alcohol with a Normal Boiling Point of 270° C. or Above

The ink composition according to this embodiment contains a polyhydric alcohol with a normal boiling point of 270° C. or above. A polyhydric alcohol with a normal boiling point of 270° C. or above refers to an organic compound having two or more hydroxyl groups bound with carbon and a normal boiling point of 270° C. or above. The normal boiling point refers to the compound's boiling point at 1 atm.

Specific examples of polyhydric alcohols with a normal boiling point of 270° C. or above include, but are not limited to, glycerol, triethylene glycol, tetraethylene glycol, triethanolamine, and tripropanolamine.

The polyhydric alcohol with a normal boiling point of 270° C. or above retards the evaporation of water from the ink composition. Even a very small amount, such as 0.0001% by mass, preferably 0.001% by mass, of the total amount of the ink composition, the presence of a polyhydric alcohol with a normal boiling point of 270° C. or above in the ink composition helps give the capability of water retention to the ink composition. Preferably, the percentage of the polyhydric alcohol with a normal boiling point of 270° C. or above in the ink composition is 1% by mass or more. This makes the ink composition excellent at water retention.

As detailed below, the ink encasement of the ink jet recording apparatus according to this embodiment is mounted on the carriage. The ink composition therefore does not need to be transferred, for example through a tube. Although a tube compartment can be a cause of accelerated evaporation of water, the ink jet recording apparatus according to this embodiment does not use a tube but rather directly transfers the ink composition from the ink encasement to the recording head, and this helps prevent the evaporation of water effectively. The ink composition therefore does not need to contain a large amount of polyhydric alcohol with a normal boiling point of 270° C. or above. By virtue of this, furthermore, the ink composition is of low viscosity, and thickens only to a limited extent over time.

In light of these, the percentage of the polyhydric alcohol with a normal boiling point of 270° C. or above in the ink composition is 26.0% by mass or less of the total amount of the ink composition for the upper limit. Preferably, the percentage is 25.5% by mass or less, more preferably 20.0% by mass or less, even more preferably 19.5% by mass or less, in particular 18% by mass or less.

1.1.3. Extra Ingredients

Besides the above ingredients, the ink composition may contain (1) a surfactant, (2) water, (3) an organic solvent, and (4) other ingredients.

(1) Surfactant

A surfactant can be of any kind, but examples include acetylene glycol surfactants, polyoxyalkylene alkyl ether surfactants, fluorosurfactants, silicone surfactants, and amphoteric surfactants. Any surfactant of such types can be used, and a combination can also be used. Polyoxyalkylene alkyl ether compounds are particularly preferred. The ink composition may produce aggregates, for example because of water evaporation, but a polyoxyalkylene alkyl ether compound in the ink composition tends to help accelerate the dissolution of such aggregates back into the ink composition. The use of a polyoxyalkylene alkyl ether compound therefore helps ensure stable ejection.

Examples of commercially available surfactants that can be used include Surfynol SE, Surfynol 61, Surfynol 104, Surfynol 420, Surfynol 82, Surfynol DF110D, Surfynol 104S, Surfynol 104PG50, Surfynol 420, Surfynol 82, Surfynol MD-20, Surfynol 485, OLFINE E1004, OLFINE E4300, and OLFINE E1010 (trade names, acetylene glycol surfactants, Nissin Chemical Industry), NOIGEN ET-116B, NOIGEN DL-0415, NOIGEN ET-106A, NOIGEN DH-0300, NOIGEN YX-400, and NOIGEN EA-160 (trade names, polyoxyalkylene alkyl ether surfactants, DKS), Newcol 1006 and 1006-AL (trade names, polyoxyalkylene alkyl ether surfactants, Nippon Nyukazai Co., Ltd.), BYK-348 (trade name, a silicone surfactant, BYK Japan KK), EMULGEN 1108 (trade name, a polyoxyalkylene alkyl ether, Kao Corporation), KF-6011, KF-6013, KF-6004, KF-6020, KF-6043, KF-643, KF-640, KF-351A, KF-354L, KF-945, X-22-6191, X-22-4515, KF-6015, KF-6017, and KF-6038 (trade names, polysiloxane surfactants, Shin-Etsu Silicone), and L-720, L-7002, FZ-2123, FZ-2105, L-7604, FZ-2104, FZ-2116, and FZ-2120 (trade names, polysiloxane surfactants, Dow Corning Toray).

Examples of amphoteric surfactants include alkylpyridinium salts, alkyl amino acid salts, and alkyl dimethyl betaines. An amphoteric surfactant can be, for example, a betaine surfactant represented by formula (b-1) below.

$$(R)_p-N-[L-(COOM)_q]_r \qquad (b-1)$$

(In formula (b-1), R represents a hydrogen atom or alkyl, aryl, or heterocyclic group. L represents a linking group with a valency of 2 or more. M represents a hydrogen atom, an alkali metal atom, an ammonium group, a protonated organic amine or nitrogen-containing heterocyclic group, or a quaternary ammonium ion group. When being a counterion for an ammonium ion that involves the N atom in formula (b-1), M represents a non-cationic group. q represents an integer of 1 or more, and r represents an integer of 1 or more and 4 or less. p represents an integer of 0 or more and 4 or less, and p+r is 3 or 4. When p+r is 4, the nitrogen atom N is a component of a quaternary amine. When p is 2 or more, the Rs may be the same or different. When q is 2 or more, the COOMs may be the same or different. When r is 2 or more, the L-(COOM)$_q$s may be the same or different.)

Preferably, the betaine surfactant represented by formula (b-1) above is a compound represented by formula (b-2).

$$(R^1)(R^2)(R^3)N^+-X-COO^- \qquad (b-2)$$

(In formula (b-2), $R^1$ to $R^3$ each independently represent a C1 to C20 alkyl group, and X represents a divalent linking group.)

Preferably, the compound represented by formula (b-2) above is the compound represented by formula (b-3) below (myristyl betaine or tetradecyl-N,N-dimethylglycine).

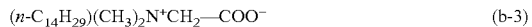

$$(n\text{-}C_{14}H_{29})(CH_3)_2N^+CH_2-COO^- \qquad (b-3)$$

The surfactant content is preferably 0.01% by mass or more and 2.0% by mass or less, more preferably 0.05% by mass or more and 1.50% by mass or less, even more preferably 0.10% by mass or more and 1.20% by mass or less of the total mass of the ink composition. A surfactant content of 0.01% by mass or more helps, for example, improve ejection stability.

(2) Water

The ink composition according to this embodiment may contain water. For example, the water can be of a type from which ionic impurities have been removed to the lowest possible levels, such as deionized water, ultrafiltered water, reverse osmosis water, distilled water, or any other type of purified or ultrapure water. The use of sterilized water, for example sterilized by ultraviolet irradiation or adding hydrogen peroxide, helps control the development of bacteria and fungi when the ink composition is stored long.

Preferably, the water content is 40% by mass or more, more preferably 45% by mass or more, even more preferably 50% by mass or more of the total amount (100% by mass) of the ink composition. A water content of 40% by mass or more makes the ink composition of relatively low viscosity. As for the upper limit, the water content is preferably 90% by mass or less, more preferably 85% by mass or less, even more preferably 80% by mass or less of the total amount of the ink composition.

(3) Organic Solvent

The ink composition may contain an organic solvent. Although optional, the use of an organic solvent is an easy way to combine quick drying and stable ejection. Water-soluble organic solvents are preferred.

A function of the organic solvent is to improve the wettability of the ink composition on a recording medium and to enhance the water retention of the ink composition. Examples of organic solvents include esters, alkylene glycol ethers, cyclic esters, nitrogen-containing solvents, and polyhydric alcohols with a normal boiling point of below 270° C. Examples of nitrogen-containing solvents include cyclic amides and acyclic amides. Examples of acyclic amides include alkoxyalkylamides.

Examples of esters include glycol monoacetates, such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, and methoxybutyl acetate, and glycol diesters, such as ethylene glycol diacetate, diethylene glycol diacetate, propylene glycol diacetate, dipropylene glycol diacetate, ethylene glycol acetate propionate, ethylene glycol acetate butyrate, diethylene glycol acetate butyrate, diethylene glycol acetate propionate, diethylene glycol acetate butyrate, propylene glycol acetate propionate, propylene glycol acetate butyrate, dipropylene glycol acetate butyrate, and dipropylene glycol acetate propionate.

An alkylene glycol ether can be any monoether or diether of an alkylene glycol, preferably an alkyl ether. Specific examples include alkylene glycol monoalkyl ethers, such as ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, and tripropylene glycol monobutyl ether, and alkylene glycol dialkyl ethers, such as ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methyl ethyl ether, diethylene glycol methyl butyl ether, triethylene glycol dimethyl ether, triethylene glycol diethyl ether, triethylene glycol dibutyl ether, triethylene glycol methyl butyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, and tripropylene glycol dimethyl ether.

Examples of cyclic esters include cyclic esters (lactones) such as β-propiolactone, γ-butyrolactone, δ-valerolactone, ε-caprolactone, β-butyrolactone, β-valerolactone, γ-valerolactone, β-hexanolactone, γ-hexanolactone, δ-hexanolactone, β-heptanolactone, γ-heptanolactone, δ-heptanolactone, ε-heptanolactone, γ-octanolactone, δ-octanolactone, ε-octanolactone, δ-nonalactone, ε-nonalactone, and ε-decanolactone and compounds derived from such lactones by substituting hydrogen(s) in the methylene group next to the carbonyl group with a C1 to C4 alkyl group.

Examples of alkoxyalkylamides include 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-propoxy-N,N-methylethylpropionamide, 3-isopropoxy-N,N-dimethylpropionamide, 3-isopropoxy-N,N-diethylpropionamide, 3-isopropoxy-N,N-methylethylpropionamide, 3-tert-butoxy-N,N-dimethylpropionamide, 3-tert-butoxy-N,N-diethylpropionamide, and 3-tert-butoxy-N,N-methylethylpropionamide.

Examples of cyclic amides include lactams, such as pyrrolidones including 2-pyrrolidone, 1-methyl-2-pyrrolidone, 1-ethyl-2-pyrrolidone, 1-propyl-2-pyrrolidone, and 1-butyl-2-pyrrolidone. These are preferred in that they help resin particles, described below, form film. 2-Pyrrolidone is particularly preferred.

It is also preferred to use an alkoxyalkylamide, which is a type of acyclic amide and is represented by formula (1) below.

$$R^1\text{—O—}CH_2CH_2\text{—}(C=O)\text{—}NR^2R^3 \quad (1)$$

In formula (1) above, $R^1$ denotes a C1 to C4 alkyl group, and $R^2$ and $R^3$ each independently denote a methyl or ethyl group. The "C1 to C4 alkyl group" can be a linear or branched alkyl group. To name a few, it can be a methyl, ethyl, n-propyl, isopropyl, n-butyl, sec-butyl, isobutyl, or tert-butyl group. One compound represented by formula (1) above may be used alone, or two or more may be used as a mixture.

Examples of polyhydric alcohols with a normal boiling point of below 270° C. include 1,2-alkanediols (e.g., alkanediols such as ethylene glycol, propylene glycol (also known as propane-1,2-diol), 1,2-butanediol, 1,2-pentanediol, 1,2-hexanediol, 1,2-heptanediol, and 1,2-octanediol) and polyols (e.g., diethylene glycol, dipropylene glycol, 1,3-propanediol, 1,3-butanediol (also known as 1,3-butylene glycol), 1,4-butanediol, 1,5-pentanediol, 1,6-hexanediol, 2-ethyl-2-methyl-1,3-propanediol, 2-methyl-2-propyl-1,3-propanediol, 2-methyl-1,3-propanediol, 2,2-dimethyl-1,3-propanediol, 3-methyl-1,3-butanediol, 2-ethyl-1,3-hexanediol, 3-methyl-1,5-pentanediol, 2-methylpentane-2,4-diol, and trimethylolpropane).

The ink composition may contain one such organic solvent as listed above alone or may contain two or more in combination. When the ink composition is made with organic solvent(s), the total percentage of organic solvents to the ink composition as a whole is 3.0% by mass or more and 30.0% by mass or less, preferably 5.0% by mass or more and 25.0% by mass or less, more preferably 10.0% by mass or more and 20.0% by mass or less.

(4) Other Ingredients

Other ingredients that may be contained in the ink composition include pH-adjusting agents, fungicides/preservatives, chelating agents, antirusts, antimolds, antioxidants, antireductants, and drying agents.

Examples of pH-adjusting agents include urea compounds, amines, morpholines, piperazines, and aminoalcohols, such as alkanolamines. Examples of urea compounds include urea, ethylene urea, tetramethylurea, thiourea, and 1,3-dimethyl-2-imidazolidinone. An example of an amine is diethanolamine. pH-adjusting agents help, for example, retard or accelerate the dissolution of impurities from materials forming the channel through which the ink flows, thereby helping adjust the detergency of the ink composition.

Examples of fungicides/preservatives include PROXEL CRL, PROXEL BDN, PROXEL GXL, PROXEL XL2, PROXEL IB, and PROXEL TN (all are trade names; Lonza). Fungicides/preservatives help control fungal and bacterial growth, thereby improving the storage of the ink composition.

Examples of chelating agents include ethylenediaminetetraacetic acid (EDTA) and the nitrilotriacetate, hexametaphosphate, pyrophosphate, and metaphosphate of ethylenediamine.

1.1.4. Use of the Ink Composition

As stated, this ink composition contains at least a water-soluble dye and a polyhydric alcohol with a normal boiling point of 270° C. or above. This ink composition, furthermore, is for use with an ink jet recording apparatus that includes the ink composition, an ink encasement in which the ink composition is encased, a recording head that ejects the ink composition, and a carriage configured to move the recording head back and forth. The carriage carries the ink encasement, with the ink encasement integrated with the carriage. The ink encasement has an ink fill port that opens and shuts as a port through which the ink composition is loaded. The following describes an ink jet recording apparatus according to this embodiment.

1.2. Structure of the Ink Jet Recording Apparatus

An ink jet recording apparatus according to this embodiment includes an ink composition as described above. The following outlines its structure excluding the ink composition by taking an ink jet recording apparatus 1 as an example. The ink jet recording apparatus 1 includes an ink composition, an ink encasement 7 in which the ink composition is encased, a recording head 3 that ejects the ink composition, and a carriage 4 configured to move the recording head 3 back and forth. The carriage 4 carries the ink encasement 7, with the ink encasement 7 integrated with the carriage 4. The ink encasement 7 has an ink fill port 71 that opens and shuts as a port through which the ink composition is loaded. In the drawings referenced in the following description, the scale may vary from element to element so that each element is recognizable.

The recording head 3 is an ink composition ejector, i.e., a component that ejects tiny droplets of the ink composition. Using this recording head 3, the ink jet recording apparatus 1 attaches droplets to a recording medium 2. FIG. 1 is an outline perspective diagram illustrating the ink jet recording apparatus 1.

As illustrated in FIG. 1, the ink jet recording apparatus 1 has a recording head 3, a carriage 4, a main scanning mechanism 5, a platen roller 6, and a control unit (not illustrated) that controls the overall operation of the ink jet recording apparatus 1. The carriage 4 carries the recording head 3 and ink encasements 7a, 7b, 7c, and 7d in which ink compositions to be supplied to the recording head 3 are contained. That is, the carriage 4 moves the recording head 3 back and forth and carries ink encasements 7a, 7b, 7c, and 7d, with the ink encasements 7a, 7b, 7c, and 7d integrated with the carriage 4. The illustrated ink encasements 7a, 7b, 7c, and 7d each represent an example of an ink encasement 7.

The ink encasements 7a, 7b, 7c, and 7d are immobilized and cannot be detached from the carriage 4 by the user. That is, the carriage 4 carries an ink encasement 7 integrated therewith. The integration between the carriage 4 and the ink encasement 7 may be achieved by producing the ink encasement 7 separately from the carriage 4 and screwing, gluing with an adhesive agent, or otherwise fastening it to the carriage 4, or may be achieved by monolithically forming the carriage 4 and the ink encasement 7. With the ink encasements 7a, 7b, 7c, and 7d immobilized on the carriage 4, the user can access their ink fill port 71, which opens and shuts, to fill, refill, etc., the ink encasements 7a, 7b, 7c, and 7d with ink compositions. The details of the ink encasement 7 will be discussed later herein.

The main scanning mechanism 5 has a timing belt 8 coupled to the carriage 4, a motor 9 that drives the timing belt 8, and a guide shaft 10. The guide shaft 10 extends in the direction in which the carriage 4 moves, or in the main scanning direction, and serves as a support for the carriage 4. The carriage 4 is driven by the motor 9 via the timing belt 8 to move back and forth along the guide shaft 10. In this way, the main scanning mechanism 5 moves the carriage 4 back and forth in the main scanning direction.

The platen roller 6 transports a recording medium 2, on which a record is produced, in a sub-scanning direction perpendicular to the main scanning direction, or along the length of the recording medium 2. The recording medium 2 is therefore transported in the sub-scanning direction. The carriage 4 moves back and forth in the main scanning direction with the recording head 3 and ink encasements 7a, 7b, 7c, and 7d thereon, and the main scanning direction is substantially identical to the direction along the width of the recording medium 2. As a result, the recording head 3 moves in the main and sub-scanning directions relative to the recording medium 2.

The ink encasements 7a, 7b, 7c, and 7d are four independent ink encasements. The same or different ink compositions can be encased in the ink encasements 7a, 7b, 7c, and 7d. These ink encasements separately contain ink compositions, for example in the colors of black, cyan, magenta, and yellow, and can be used in any combination. The number of ink encasements does not need to be four as illustrated in FIG. 1. On the bottom of the ink encasements 7a, 7b, 7c, and 7d is a supply port (hidden in FIG. 1) through which the ink composition contained is supplied to the recording head 3. By virtue of integration with the carriage 4, the ink encasements 7a, 7b, 7c, and 7d, unlike cartridges, do not expose their supply port to the outside. This helps reduce contamination through the supply port, such as air entrainment.

The recording head 3 ejects ink compositions supplied from the ink encasements 7a, 7b, 7c, and 7d and attaches them to a recording medium 2 through multiple nozzles under the control of the control unit (not illustrated). On its surface facing the recording medium 2 to which the ink compositions are attached, the recording head 3 has multiple nozzles (hidden in FIG. 1) through which it ejects the ink compositions and attaches them to the recording medium 2. These multiple nozzles are lined up to form nozzle lines, and there are separate nozzle lines for ink compositions in different colors. Each ink composition is supplied from an ink encasement to the recording head 3 and ejected as droplets through the nozzles by the action of actuators (not illustrated) provided inside the recording head 3. The ejected droplets of ink compositions land on the recording medium 2, forming an image, text, a pattern, an expression of colors, etc., of the ink compositions on the recording medium 2.

The recording head 3 uses piezoelectric elements as driving actuators, but this is not the only possible mode of driving. For example, the actuators may be electromechanical transducers, which displace a diaphragm as an actuator using electrostatic attraction, or electrothermal transducers, which eject droplets of an ink composition using bubbles generated by heating.

In the X-Y-Z coordinate system illustrated in FIG. 1, the X direction is the direction in which the recording head 3 and ink encasements 7a, 7b, 7c, and 7d move (i.e., the direction in which the carriage 4 moves) and at the same time is along the width of the ink jet recording apparatus 1. The Y direction represents the direction along the depth of the ink jet recording apparatus 1 (i.e., the direction in which the recording medium 2 moves), and the Z direction represents the direction along the height of the ink jet recording apparatus 1. In FIG. 1, the +Y direction is toward the front of the ink jet recording apparatus 1, whereas the −Y direction is toward the back or rear of the ink jet recording apparatus 1. In the front view of the ink jet recording apparatus 1, the direction toward the right is the +X direction, and that toward the left is the −X direction. The +Z direction is toward the top (including the upper portion, the top surface, etc.) of the ink jet recording apparatus 1, and the −Z direction is toward the bottom (including the lower portion, the bottom surface, etc.) of the ink jet recording apparatus 1.

1.3. Ink Encasement

Figure 2:
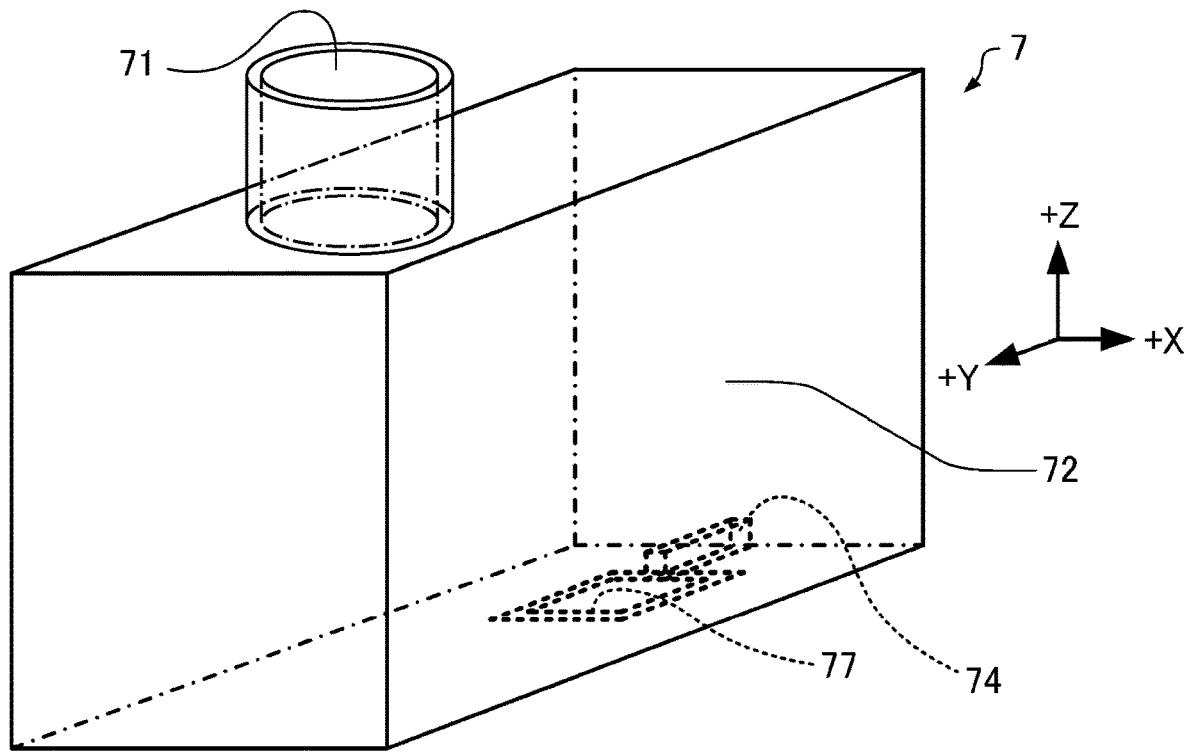
FIG. 2 is a perspective diagram schematically illustrating an ink encasement according to an embodiment.

This ink jet recording apparatus 1 has four ink encasements, ink encasements 7a, 7b, 7c, and 7d, and all of them have an ink fill port 71 that opens and shuts as a port through which an ink composition is loaded. In the following, an ink encasement 7 that can be used as any of the ink encasements 7a, 7b, 7c, and 7d is described with reference to FIG. 2. FIG. 2 is a perspective diagram schematically illustrating the ink encasement 7. In the X-Y-Z coordinate system illustrated in FIG. 2, the X direction is the direction in which the recording head 3 and ink encasement 7 move (i.e., the direction in which the carriage 4 moves).

1.3.1. Shape and Other Details of the Ink Encasement

The ink encasement 7 has at least an ink fill port 71 that opens and shuts as a port through which an ink composition is loaded. In the example illustrated in FIG. 2, the ink encasement 7 has an ink fill port 71, an encasing chamber 72, and an ink discharge port 74.

The encasing chamber 72 encases an ink composition. The encasing chamber 72 has a substantially rectangular parallelepiped shape, defined by the encasement's frame. The walls that define the encasing chamber 72 are of, for example, a shaped plastic article or film. Preferably, the walls that define the encasing chamber 72 are of polypropylene. The schematic in FIG. 2 assumes that the encasement's frame has no thickness. The encasing chamber 72 and the frame can be in any shape as long as the ink encasement 7 can encase and eject an ink composition and can be immobilized on the carriage 4. For example, the ink encasement 7 may have inside the encasing chamber 72 a component that reinforces the structural strength of its frame, such as ribs or a pillar.

The ink encasement 7 is narrow in the X direction, and the X direction is identical to the direction in which the carriage 4 moves (main scanning direction). As the carriage 4 moves, the ink encasement 7 thereon is rocked in the X direction. The width, in the X direction, of the ink encasement 7 is 1 cm or more and 10 cm or less for example, preferably 2 cm or more and 7 cm or less. When the ink encasement 7 has such a width, in the X direction, the maximum width, in the X direction, of the encasing chamber 72 can be 0.6 cm or more, preferably 1.6 cm or more.

The capacity of the encasing chamber 72 is greater than that of ordinary ink cartridges. For example, the encasing chamber 72 has a capacity of 10 mL or more and 500 mL or less, preferably 20 mL or more and 300 mL or less, more preferably 30 mL or more and 200 mL or less, even more preferably 50 mL or more and 200 mL or less.

As stated, the ink encasement 7 is rocked as the carriage 4 moves. Designing the ink encasement 7 and the encasing chamber 72 with such dimensions as given above ensures that this rocking motion shakes and stirs the encased ink composition.

The encasing chamber 72 communicates with the ink fill port 71 and the ink discharge port 74. The ink fill port 71 is an opening that communicates with the encasing chamber 72. The ink fill port 71 is above the encasing chamber 72 (up in the Z direction). The ink fill port 71 has a lid not illustrated. The lid opens and shuts, and is manipulated, for example by the user, when the ink encasement 7 is refilled with the ink composition or for other needs. A check valve, which automatically opens and shuts, in a passage through which the ink composition flows cannot be the lid.

The ink discharge port 74 is an opening that communicates with the encasing chamber 72. The ink discharge port 74 is below the encasing chamber 72 (down in the Z direction). The ink discharge port 74 is an opening through which the ink composition encased in the encasing chamber 72 is discharged toward the recording head 3. The ink discharge port 74 has a filter 80, which is described later herein.

The ink composition is introduced through the ink fill port 71 into the encasing chamber 72 and discharged through the ink discharge port 74. An ink composition introduced into the encasing chamber 72 accumulates in the lower portion (down in the Z direction) by the action of the force of gravity, with a gas in the upper portion (up in the Z direction). When an ink composition is ejected from the recording head 3 in a recording job performed using the ink jet recording apparatus 1, an appropriate volume, based on the volume that should be ejected, of the ink composition is discharged through the ink discharge port 74. The ink encasement 7 may have components like an opening or valve that regulates the pressure inside its encasing chamber 72 and/or a detector that detects the amount of ink composition inside.

Preferably, the ink composition comes into contact with the material forming the encasing chamber 72 at an angle of 45° or less. More preferably, the angle of contact between the ink composition and the material forming the encasing chamber 72 is 40° or less, even more preferably 35° or less. An angle of contact of 45° or less is advantageous in that it prevents air entrainment, especially in initial loading, thereby helping avoid air bubbles in the ink composition.

1.3.2. Filter

Figure 3:
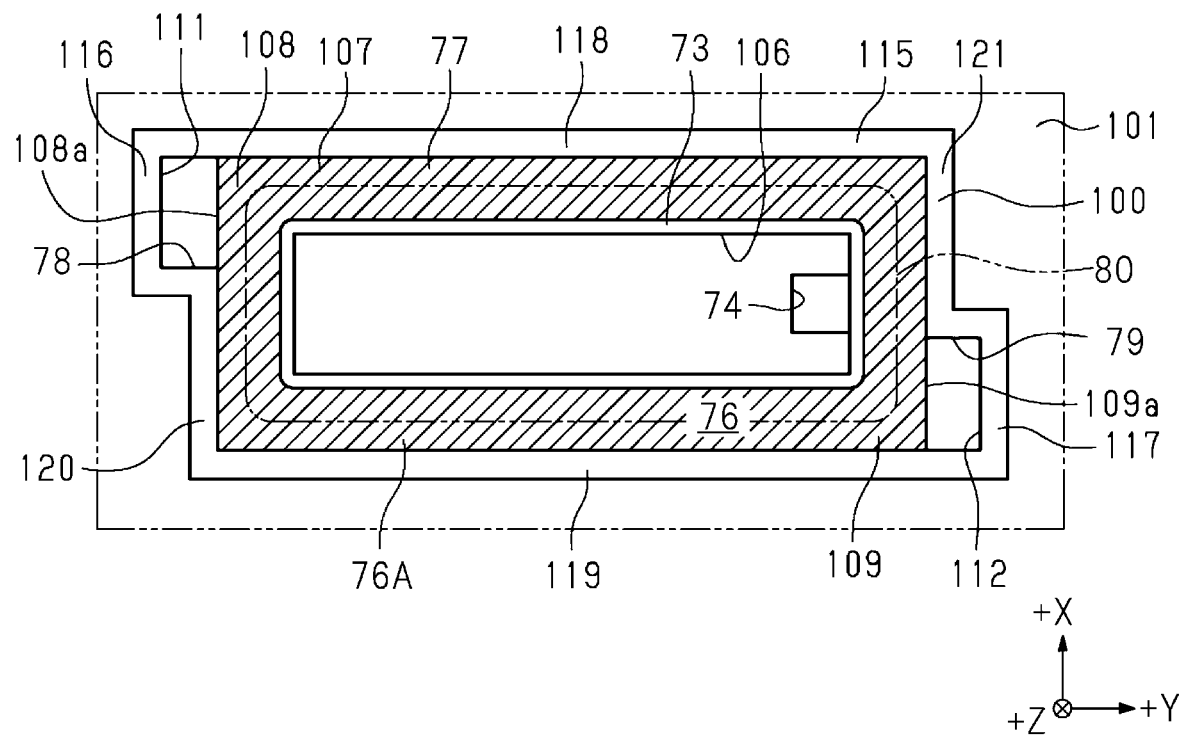
FIG. 3 is a schematic view of an outline structure of the ink discharge port and related elements of an ink encasement.
Figure 4:
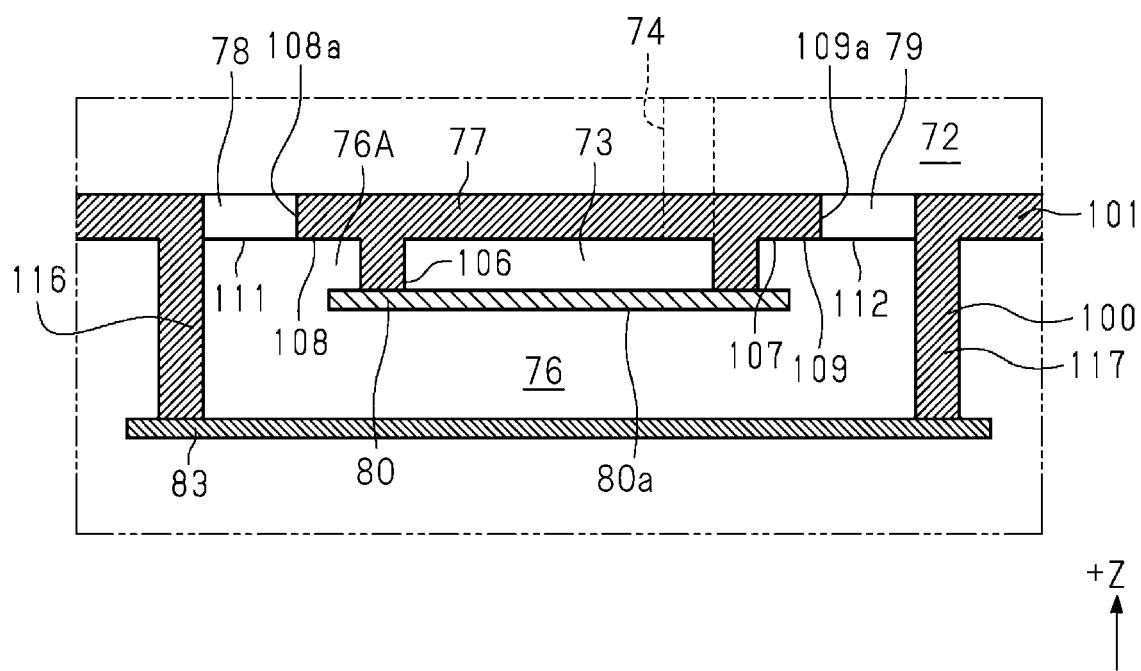
FIG. 4 is a schematic view of an outline structure of the ink discharge port and related elements of an ink encasement.

The following describes an outline structure of the ink discharge port 74 and related elements of the ink encasement 7 with reference to FIGS. 3 and 4. FIG. 3 illustrates the structure of a filter compartment 76 and related elements of the ink encasement 7 in use, in the plan view from the −Z direction. A filter 80 is not illustrated.

The ink composition is transported to the recording head 3 through the filter compartment 76 and then the ink discharge port 74. In the illustrated example, the ink discharge port 74 communicates with the filter compartment 76, extends in the +Z direction, and then extends toward the back (wall in the −Y direction) of the ink encasement 7 as illustrated in FIG. 2. While the ink encasement 7 is in use, the filter compartment 76 is to the −Z direction of the encasing chamber 72.

The filter compartment 76 communicates with the encasing chamber 72. To be more specific, the filter compartment 76 is coupled to the encasing chamber 72 by multiple communication paths created in a partition 77 that separates the encasing chamber 72 from the filter compartment 76. The filter compartment 76 is coupled to the encasing chamber 72 by a first communication path 78 and a second communication path 79.

In the filter compartment 76 is a filter 80. The filter compartment 76 is a space into which an ink composition flows that has yet to be filtered through the filter 80. The filter 80 is, for example, a flat plate of stainless steel perforated with multiple pores. The filter 80 has an inflow surface 80a through which the ink composition flows in. The filter 80 allows the ink composition to pass through the pores and traps contaminants larger than the pores. By trapping contaminants contained in the ink composition passing therethrough, the filter 80 limits the inflow of contaminants going downstream of it. As a result, the clogging of the recording head 3 caused by contaminants and poor ejection of the ink composition are reduced. The filter 80 only needs to accomplish trapping contaminants while allowing the ink composition to pass through; the filter 80 does not need to be made of stainless steel but may be made of any other material.

The ink composition that has passed through the filter 80 is guided to the ink discharge port 74 through a guide path 73 created in the partition 77. The guide path 73 guides the ink composition that has passed through the filter 80 to the ink discharge port 74, thereby guiding the ink composition out of the filter compartment 76 toward the recording head 3. The ink discharge port 74 may have components like valve mechanisms and/or other filters.

As illustrated in FIGS. 3 and 4, the partition 77 has a guide path 73. The guide path 73 is inside a surrounding-wall section 100. The guide path 73 is shaped like a quadrangular prism extending in the Z direction. The guide path 73 has an outlet 106 at its −Z end. At the −Z end of the guide path 73 is the filter 80. The outlet 106 is therefore covered by the filter 80.

The guide path 73 guides the ink composition that has passed through the filter 80 to the ink discharge port 74. In other words, the guide path 73 guides the ink composition that has passed through the filter 80 toward the recording head 3.

The size of the filter 80 is such that its periphery is outside the guide path 73 in the plan view of the ink encasement 7 from the −Z direction and that there is a gap between the periphery and a surrounding-wall section 100. The space located between the guide path 73 and the surrounding-wall section 100 in the direction perpendicular to the Z direction is a circular space positioned to the +Z direction of the filter 80 and is also "an opening space," to which the first and second communication paths 78 and 79 open.

The partition 77 has a filter-compartment surface 107, a surface that forms the top surface, or the surface in the +Z direction, of the filter compartment 76. The filter-compartment surface 107 is also the top surface of the opening space. In FIG. 3, the filter-compartment surface 107 is shaded. While the ink encasement 7 is in use, the filter-compartment surface 107 includes the X and Y directions. The filter-compartment surface 107 has a quadrangular periphery, specifically a rectangular periphery, positioned outside the outlet 106 in the plan view of the ink encasement 7 from the −Z direction. The filter-compartment surface 107 has its longitudinal dimension along the Y direction and its transverse dimension is along the X direction. The filter-compartment surface 107 has a first corner 108 and a second corner 109, which are a pair of corners opposite each other with the outlet 106 therebetween. The first corner 108 is formed by a portion of the filter-compartment surface 107 extending in the +X direction from the center in the X direction and a portion extending in the −Y direction from the center in the Y direction. The second corner 109 is formed by a portion of the filter-compartment surface 107 extending in the −X direction from the center in the X direction and a portion extending in the +Y direction from the center in the Y direction.

The first communication path 78 has a first communication opening 111, an opening that opens to the filter compartment 76. The second communication path 79 has a second communication opening 112, which is also an opening that opens to the filter compartment 76. The first and second communication openings 111 and 112 are farther in the +Z direction than the inflow surface 80a of the filter 80.

In the plan view of the ink encasement 7 from the −Z direction, the first communication opening 111 is shaped like a quadrangle whose longitudinal dimension is along the X direction. The first communication opening 111 is defined by part of the periphery of the first corner 108. The first communication opening 111 is to the −Y direction of the first corner 108, and its +Y side is defined by part of the −Y periphery 108a of the first corner 108. The first communication opening 111 has a portion positioned to the +X direction of the outlet 106 in the X direction. The first communication opening 111 also has a portion positioned to the −Y direction of the outlet 106 in the Y direction.

In the plan view of the ink encasement 7 from the −Z direction, the second communication opening 112 is shaped like a quadrangle whose longitudinal dimension is along the X direction. The second communication opening 112 is defined by part of the periphery of the second corner 109. The second communication opening 112 is to the +Y direction of the second corner 109, and its −Y side is defined by part of the +Y periphery 109a of the second corner 109. The second communication opening 112 has a portion positioned to the −X direction of the outlet 106 in the X direction. The second communication opening 112 also has a portion positioned to the +Y direction of the outlet 106 in the Y direction.

As illustrated in FIG. 3, the surrounding-wall section 100 is integrated with the periphery of a partition 77 that has the filter-compartment surface 107 and first and second communication openings 111 and 112. The surrounding-wall section 100 has a wall body 115, a first projection 116, and a second projection 117. The surrounding-wall section 100 shaped like a tube extending in the Z direction. At the −Z end of the surrounding-wall section 100 is film 83 attached to provide a hermetic seal. In this way, the filter compartment 76 is constructed.

Along the periphery of the partition 77, walls extend in the −Z direction except in the portions defining the first and second communication openings 111 and 112. The wall body 115 is formed by these walls and has a first wall 118, a second wall 119, a third wall 120, and a fourth wall 121.

While the ink encasement 7 is in use, the first and second walls 118 and 119 include the Y and Z directions. The first wall 118 is located in the +X direction, and the second wall 119 is located in the −X direction. The third and fourth walls 120 and 121 include the X and Z directions. The third wall 120 is located in the −Y direction, and the fourth wall 121 is located in the +Y direction. The −Y end of the first wall 118 is coupled to the +X end of the third wall 120, with the first projection 116 therebetween. The +Y end of the first wall 118 is coupled to the +X end of the fourth wall 121. The −Y end of the second wall 119 is coupled to the −X end of the third wall 120. The +Y end of the second wall 119 is coupled to the −X end of the fourth wall 121, with the second projection 117 therebetween. In the plan view of the ink encasement 7 from the −Z direction, the wall body 115 is shaped like a quadrangular frame that is open along part of its +X wall and along part of its −X wall.

There are also walls extending in the −Z direction along the portions of the periphery of the partition 77 defining the first communication opening 111, and the first projection 116 is formed by these walls. The first projection 116 is integrated with the −Y end of the first wall 118 and the +X end of the third wall 120. In the plan view of the ink encasement 7 from the −Z direction, the first projection 116 sticks out in the −Y direction. In other words, in the plan view of the ink encasement 7 from the −Z direction, the first projection 116 sticks out in the −Y direction at a corner of the quadrangular frame-shaped wall body 115. The first communication opening 111 is in the region enclosed by the first projection 116 in the plan view of the ink encasement 7 from the −Z direction.

There are also walls extending in the −Z direction along the portions of the periphery of the partition 77 defining the second communication opening 112, and the second projection 117 is formed by these walls. The second projection 117 is integrated with the +Y end of the second wall 119 and the −X end of the fourth wall 121. In the plan view of the ink encasement 7 from the −Z direction, the second projection 117 sticks out in the +Y direction. In other words, in the plan view of the ink encasement 7 from the −Z direction, the second projection 117 sticks out in the +Y direction at the corner of the quadrangular frame-shaped wall body 115 opposite the corner at which the first projection 116 is located. The second communication opening 112 is in the region enclosed by the second projection 117 in the plan view of the ink encasement 7 from the −Z direction.

The operation of the ink encasement 7 and the ink jet recording apparatus 1 is as follows.

The filter compartment 76 is loaded with an ink composition that flows thereinto from the encasing chamber 72 through the first and second communication paths 78 and 79. The ink composition that has entered the filter compartment 76 switches its direction of flow to the +Z direction and then flows into the filter 80. After passing through the filter 80, the ink composition is guided through the guide path 73 to the ink discharge port 74 and eventually supplied to the recording head 3.

That is, the ink composition passes through the filter 80 against the force of gravity when flowing from the ink encasement 7 to the recording head 3. By virtue of this, any contaminant in the ink composition, e.g., unintended aggregates, that comes from the encasing chamber 72 into the filter compartment 76 through the first or second communication path 78 or 79 adheres to the inflow surface 80a of the filter 80 as the ink composition flows therethrough. The contaminant that has adhered to the inflow surface 80a of the filter 80 easily detaches therefrom by the action of gravity and as a result of the rocking motions that occur when the carriage 4 moves back and forth in the main scanning direction. The rocking motions, moreover, tend to accelerate the process of the aggregates dissolving back in the ink composition. This helps prevent the filter 80 from losing its effective area, thereby helping prevent the resistance of the flow channel from increasing. A filter 80 set in such a way also helps improve ejection stability because it limits the entry of contaminants, such as unintended aggregates, into the recording head 3.

1.3.3. Multiple Ink Encasements

As stated, the ink jet recording apparatus according to this embodiment may have multiple ink encasements. An ink composition as described above only needs to be encased in at least one of the multiple ink encasements. When only one or a subset of the ink encasements of the ink jet recording apparatus encase an ink composition as described above, the rest may encase, for example, an ink composition that contains a disperse colorant, or a disperse-colorant ink composition.

That is, the carriage 4 of the ink jet recording apparatus 1 according to this embodiment may carry a disperse-colorant ink encasement, in which a disperse-colorant ink composition is encased, as an extra ink encasement 7. When it does, the recording head 3 may eject the disperse-colorant ink composition and ink composition(s) as described above.

The disperse-colorant ink encasement is not described; it is similar to the ink encasement 7 described above. The disperse-colorant ink composition can be as follows.

The disperse-colorant ink composition contains a disperse colorant. Disperse colorants are colorants insoluble in solvents, such as pigments and disperse dyes.

Any pigment or dye insoluble or sparingly soluble in solvents can be used. Examples include inorganic pigments, organic pigments, solvent dyes, and disperse dyes. The color of the pigment or dye is not critical either. The color of the pigment or dye may be what is called a process color, such as cyan, magenta, yellow, or black, or may be what is called a spot color, such as white, a fluorescent color, or a glitter color.

Examples of inorganic pigments that can be used include carbon black (C.I. Pigment Black 7) pigments, such as furnace black, lamp black, acetylene black, and channel black, iron oxide, titanium oxide, zinc oxide, and silica.

Examples of carbon black pigments include Mitsubishi Chemical Corporation's No. 2300, 900, MCF88, No. 20B, No. 33, No. 40, No. 45, No. 52, MA7, MA8, MA100, and No. 2200B. Other examples include Degussa's Color Black FW1, FW2, FW2V, FW18, FW200, 5150, 5160, and 5170, Printex 35, U, V, and 140U, and Special Black 6, 5, 4A, 4, and 250, Columbian Carbon's Conductex SC and Raven 1255, 5750, 5250, 5000, 3500, 1255, and 700, and Cabot's REGAL 400R, 330R, and 660R, MOGUL L, MONARCH 700, 800, 880, 900, 1000, 1100, 1300, and 1400, and ELFTEX 12.

Examples of organic pigments include quinacridone pigments, quinacridone quinone pigments, dioxazine pigments, phthalocyanine pigments, anthrapyrimidine pigments, anthanthrone pigments, indanthrone pigments, flavanthrone pigments, perylene pigments, diketopyrrolopyrrole pigments, perinone pigments, quinophthalone pigments, anthraquinone pigments, thioindigo pigments, benzimidazolone pigments, isoindolinone pigments, azomethine pigments, and azo pigments.

Examples of cyan pigments include C.I. Pigment Blue 1, 2, 3, 15:3, 15:4, 15:34, 16, 22, and 60 and C.I. Vat Blue 4 and 60. An example of a preferred cyan pigment is one or a mixture of two or more selected from the group consisting of C.I. Pigment Blue 15:3, 15:4, and 60.

Examples of magenta pigments include C.I. Pigment Red 5, 7, 12, 48 (Ca), 48 (Mn), 57 (Ca), 57:1, 112, 122, 123, 168, 184, and 202 and C.I. Pigment Violet 19. An example of a preferred magenta pigment is one or a mixture of two or more selected from the group consisting of C.I. Pigment Red 122, 202, and 209 and C.I. Pigment Violet 19.

Examples of yellow pigments include C.I. Pigment Yellow 1, 2, 3, 12, 13, 14C, 16, 17, 73, 74, 75, 83, 93, 95, 97, 98, 119, 110, 114, 128, 129, 138, 150, 151, 154, 155, 180, and 185. An example of a preferred yellow pigment is one or a mixture of two or more selected from the group consisting of C.I. Pigment Yellow 74, 109, 110, 128, and 138.

An orange pigment can be, for example, C.I. Pigment Orange 36 or 43. A mixture of them can also be used. In an aqueous green ink for ink jet recording, a pigment can be C.I. Pigment Green 7 or 36, and a mixture of them can also be used.

A glitter pigment can be any kind of pigment that can glitter on a medium. Examples include metal particles, which are particles of one, or an alloy of two or more, selected from the group consisting of aluminum, silver, gold, platinum, nickel, chromium, tin, zinc, indium, titanium, and copper (alloys also referred to as metallic pigments), and pearl pigments, which have a pearly gloss. Typical examples of pearl pigments include pigments having a pearlescent or interference gloss, such as titanium dioxide-coated mica, pearl essence, and bismuth oxychloride. Glitter pigments that have been surface-treated to be inert with water can also be used.

Examples of white pigments include metal compounds, such as metal oxides, barium sulfate, and calcium carbonate. Examples of metal oxides include titanium dioxide, zinc oxide, silica, alumina, and magnesium oxide. Hollow particles can also be used as a white pigment.

A disperse or solvent dye can be any kind of colorant that does not dissolve but disperses in the ink vehicle. Examples include azo dyes, metal complex azo dyes, anthraquinone dyes, phthalocyanine dyes, and triarylmethane dyes.

Examples of disperse dyes include C.I. Disperse Red 60, 82, 86, 86:1, 167:1, and 279, C.I. Disperse Yellow 64, 71, 86, 114, 153, 233, and 245, C.I. Disperse Blue 27, 60, 73, 77, 77:1, 87, 257, and 367, C.I. Disperse Violet 26, 33, 36, and 57, and C.I. Disperse Orange 30, 41, and 61.

The pigments and dyes listed above are merely examples. One or two or more such pigments or dyes may be used, or even a combination of pigment(s) and dye(s) may be used.

Preferably, the disperse colorant reaches stable dispersion in the ink. For example, a pigment may be rendered self-dispersible through a surface treatment of the pigment particles, such as surface oxidation or sulfonation, with ozone, hypochlorous acid, fuming sulfuric acid, etc. Alternatively, a polymeric dispersant may be used.

Besides the disperse colorant, the disperse-colorant ink composition can contain water, an organic solvent, a surfactant, and other ingredients. These ingredients are not described; they are as described in the above Ink Composition section.

When the ink jet recording apparatus 1 carries a disperse-colorant ink encasement, in which a disperse-colorant ink composition is encased, as an extra ink encasement 7 on its carriage 4 and ejects the disperse-colorant ink composition and an ink composition as described above from its recording head 3, the following advantages are obtained.

In a disperse-colorant ink composition, what makes the colorant disperse is an electrostatic action. Mixing it with a dye ink, which has a relatively high ionic concentration, therefore breaks the dispersion of the colorant and causes the colorant to aggregate. When one recording head ejects a disperse-colorant ink and a dye ink, for example, the two inks can mix together even without direct contact, for example due to mixing of mists. The mixture forms aggregates, which can cause poor ejection and other defects by adhering to the nozzle plate. Furthermore, when the ink jet recording apparatus 1 has a suction cap, a tool for ink flushing and other purposes, sucking the disperse-colorant and dye inks at the same time can cause the colorant to aggregate in the cap. The aggregates produced can accumulate in the cap.

The ink jet recording apparatus 1 according to this embodiment carries a disperse-colorant ink encasement and a water soluble dye-containing ink composition as described above on its carriage 4. Water in both inks therefore evaporates only slowly. The concentration of the dye and that of the disperse colorant therefore do not easily increase, and, even when the two inks mix together, the formation of aggregates is limited. This helps keep the ejection stable and, when the recording apparatus 1 has a suction cap, also helps control the accumulation of aggregates in the suction cap.

2. Ink Jet Recording Method

An ink jet recording method according to this embodiment is a recording method in which an ink jet recording apparatus is used that includes an ink composition, an ink encasement in which the ink composition is encased, a recording head that ejects the ink composition, and a carriage configured to move the recording head back and forth. The carriage carries the ink encasement, with the ink encasement integrated with the carriage. The ink encasement has an ink fill port that opens and shuts as a port through which the ink composition is loaded. The ink composition contains a water-soluble dye and a polyhydric alcohol with a normal boiling point of 270° C. or above. The percentage of the polyhydric alcohol is 26.0% by mass or less of a total amount of the ink composition. The method includes ejecting the ink composition from the recording head to attach the ink composition to a recording medium.

The recording medium can be of any kind. It may have a recording surface that absorbs the ink composition or may have no such recording surface. Any kind of recording medium can therefore be used. Examples include paper, film, cloth, metal, glass, and polymers.

3. Examples and Comparative Examples

The following describes an aspect of the present disclosure in detail by providing examples, but no aspect of the disclosure is limited to these Examples. In the following, "parts" and "%" are by mass unless stated otherwise.

3.1. Preparation of Ink Compositions

Table 1 summarizes the formulae of the ink compositions of Examples and Comparative Examples. Each ink composition was prepared by mixing the ingredients specified in Table 1, stirring them for 30 minutes or longer, and filtering the mixture. The mixing of the ingredients was by adding the materials one by one to a container equipped with a mechanical stirrer and then stirring and mixing the materials. The resulting mixture was filtered to complete the ink composition of the Example or Comparative Example (Examples 1 to 11 and Comparative Examples 1 to 3). In Table 1, the numerical values representing the amounts of ingredients are in the unit of % by mass.

TABLE 1

| | | Examples | | | | | | | |
|---|---|---|---|---|---|---|---|---|---|
| | Ingredient name | 1 | 2 | 3 | 4 | 5 | 6 | 7 | 8 |
| Water-soluble dyes | Direct Blue 199 | 5.0 | — | — | — | — | — | — | — |
| | Reactive Red 141 | — | 8.0 | — | — | — | — | — | — |
| | Direct Yellow 86 | — | — | 4.0 | — | 4.0 | 4.0 | 4.0 | 4.0 |
| | Black dye 1 | — | — | — | 2.0 | — | — | — | — |
| | Black dye 2 | — | — | — | 3.0 | — | — | — | — |
| Polyhydric alcohols with a normal boiling point of 270° C. or above | Glycerol (290° C.) | 10.0 | 10.0 | 10.0 | 10.0 | 10.0 | 10.0 | — | 8.0 |
| | Triethylene glycol (287.4° C.) | 2.0 | 5.3 | 7.0 | — | 7.0 | 7.0 | 12.0 | 7.0 |
| | Triethanolamine (360° C.) | 0.1 | 0.5 | 0.5 | 0.1 | 0.5 | 0.5 | 3.0 | 0.5 |
| Extra ingredients | 2-Pyrrolidone | 1.0 | 3.0 | 3.0 | 3.0 | 3.0 | 3.0 | 3.0 | 3.0 |
| | TEGmBE | 7.0 | 9.5 | 9.0 | 7.5 | 9.0 | 9.0 | 9.0 | 9.0 |
| | Newcol 1006-AL | 0.5 | 0.5 | 1.0 | 3.0 | 1.0 | — | 1.0 | 1.0 |
| | OLFINE E1010 | 1.0 | 1.0 | 1.0 | 1.0 | 1.0 | 1.0 | 1.0 | 1.0 |
| | Purified water | Balance | Balance | Balance | Balance | Balance | Balance | Balance | Balance |
| | Ink encasement position | ON | ON | ON | ON | ON | ON | ON | ON |
| | Filter type | A | A | A | A | B | A | A | A |
| | Percentage of polyhydric alcohols with a boiling point of 270° C. or above | 12.1 | 15.8 | 17.5 | 10.1 | 17.5 | 17.5 | 15.0 | 15.5 |
| Test results | Water evaporation | A | A | A | A | A | A | B | A |
| | Viscosity (initial) | A | A | A | A | A | A | B | A |

TABLE 1-continued

|  |  | Examples | | | | | | | |
|---|---|---|---|---|---|---|---|---|---|
| Ejection stability (permanent) | | A | A | A | A | C | C | B | A |
| Accumulation (vs. P1) | | A | A | A | A | A | B | A | A |

| | | Examples | | | Comparative Examples | | |
|---|---|---|---|---|---|---|---|
| | Ingredient name | 9 | 10 | 11 | 1 | 2 | 3 |
| Water-soluble dyes | Direct Blue 199 | — | — | — | — | — | — |
| | Reactive Red 141 | — | — | — | — | — | — |
| | Direct Yellow 86 | 4.0 | 4.0 | 4.0 | 4.0 | 4.0 | 4.0 |
| | Black dye 1 | — | — | — | — | — | — |
| | Black dye 2 | — | — | — | — | — | — |
| Polyhydric alcohols with a normal boiling point of 270° C. or above | Glycerol (290° C.) | 1.0 | 12.0 | 18.0 | 19.0 | — | 10.0 |
| | Triethylene glycol (287.4° C.) | 7.0 | 7.0 | 7.0 | 7.0 | — | 7.0 |
| | Triethanolamine (360° C.) | 0.5 | 0.5 | 0.5 | 0.5 | — | 0.5 |
| Extra ingredients | 2-Pyrrolidone | 3.0 | 3.0 | 3.0 | 3.0 | 3.0 | 3.0 |
| | TEGmBE | 9.0 | 9.0 | 9.0 | 9.0 | 9.0 | 9.0 |
| | Newcol 1006-AL | 1.0 | 1.0 | 1.0 | 1.0 | 1.0 | 1.0 |
| | OLFINE E1010 | 1.0 | 1.0 | 1.0 | 1.0 | 1.0 | 1.0 |
| | Purified water | Balance | Balance | Balance | Balance | Balance | Balance |
| Ink encasement position | | ON | ON | ON | ON | ON | OFF |
| Filter type | | A | A | A | A | A | A |
| Percentage of polyhydric alcohols with a boiling point of 270° C. or above | | 8.5 | 19.5 | 25.5 | 26.5 | — | 17.5 |
| Test results | Water evaporation | B | A | A | A | C | C |
| | Viscosity (initial) | C | A | B | C | C | A |
| | Ejection stability (permanent) | B | A | B | D | D | D |
| | Accumulation (vs. P1) | A | B | B | C | A | C |

The abbreviated names of ingredients in Table 1 represent the following materials.
C.I. Direct Blue 199
C.I. Reactive Red 141
C.I. Direct Yellow 86
Black dye 1: C.I. Direct Black 195
Black dye 2: C.I. Acid Black 41
TEGmBE: Triethylene glycol monobutyl ether (reagent grade)
Newcol 1006-AL: A polyoxyalkylene alkyl ether surfactant (Nippon Nyukazai Co., Ltd.)
OLFINE E1010: An acetylene glycol surfactant (Nissin Chemical Industry Co., Ltd.)

Table 1 also includes the type of ink encasement used in testing. "ON" refers to "on carriage," which means the ink encasement was mounted on a carriage as in the above embodiment. "OFF" refers to "off carriage," which means the ink encasement was not mounted on a carriage. In this case the ink encasement was attached to the body of a recording apparatus, and the ink composition therein was supplied to a recording head on a carriage through a tube.

Table 1 also includes the type of filter. "A" in that row refers to a filter as described in the above embodiment: the filter was installed in such a manner that the ink composition would pass through it against the force of gravity when flowing from the ink encasement to the recording head. "B" refers to a filter installed in such a manner that the ink composition would pass through it with the force of gravity when flowing from the ink encasement to the recording head.

Although not presented in the table, the ink compositions of the Examples all came into contact at an angle of 40° or less with the inner wall of the ink tank used in the testing described below.

Table 1 also covers the total amount of polyhydric alcohols with a normal boiling point of 270° C. or above in the ink composition of each Example or Comparative Example.

3.2. Testing

The ink compositions of the Examples and Comparative Examples were tested as follows.

3.2.1. Water Evaporation

In Examples 1 to 11 and Comparative Examples 1 and 2, a 60-mL ink encasement was filled with the ink composition of the Example or Comparative Example to simulate the "on carriage" configuration. The ink encasement was left for 10 days under the conditions of a temperature of 40° C. and a humidity of 20%, and the amount of evaporated water was calculated from the change in the weight of the ink tank section.

In Comparative Example 3, a 60-mL ink tank and an elastomer tube 100 cm long and 1 mm in inner diameter were each filled with the ink composition of the Comparative Example to simulate the "off carriage" configuration. The ink tank and tube were left for 10 days under the conditions of a temperature of 40° C. and a humidity of 20%, and the amount of evaporated water was calculated from the change in the weight of the ink tank section and tube.

Water evaporation was graded according to the criteria below. The results are presented in Table 1.

A: The amount of evaporated water is less than 0.5 g.
B: The amount of evaporated water is 0.5 g or more and less than 1.0 g.
C: The amount of evaporated water is 1.0 g or more.

3.2.2. Viscosity (initial)

The viscosity of the freshly prepared ink composition of the Example or Comparative Example was measured as initial viscosity. The measurements were taken using a Cannon-Fenske viscometer under the conditions of a temperature of 25° C. and a relative humidity of 40%. The measured viscosity was graded according to the criteria below. The results are presented in Table 1.

A: The measured viscosity is 3.4 mm²/s or more and 3.9 mm²/s or less.

B: The measured viscosity is 2.9 mm²/s or more and less than 3.4 mm²/s or more than 3.9 mm²/s and 4.4 mm²/s or less.

C: The measured viscosity is less than 2.9 mm²/s or more than 4.4 mm²/s.

3.2.3. Ejection Stability (permanent)

Seiko Epson Corporation's PX-S170T was modified by placing a filter in the bottom of the ink tank in the A or B position in Table 1 to make a test printer whose ink tank was immobilized on a carriage and had an ink fill port. The ink tank was made of polypropylene. The ink composition of the Example or Comparative Example was loaded into this printer, the printer was left for 7 days under the conditions of a temperature of 40° C. and a humidity of 20%, and then a nozzle check pattern was printed. Ejection stability was graded according to the criteria below. The results are presented in Table 1. Misregistration refers to a state in which a line in the nozzle check pattern is not straight. Specifically, the line is faint, curved, or partly missing. Grade A, B, or C indicates beneficial effects.

A: The check pattern is complete without misregistration.

B: The check pattern has no sign of misfiring nozzles, but misregistration is observed.

C: There is a sign of misfiring nozzles, but two rounds of cleaning resolve the misfiring nozzles.

D: There is a sign of misfiring nozzles, and a round of cleaning is not enough to resolve the misfiring nozzles.

3.2.4. Accumulation (vs. P1)

To evaluate accumulation, the ink composition of each Example or Comparative Example was mixed with a pigment ink P1, and the change in the diameter of particles dispersed in the pigment ink P1 was monitored. The formula of the pigment ink P1 was as follows: trimethylolpropane, 2.0% by mass; glycerol, 2.0% by mass; triethylene glycol, 2.0% by mass; triethanolamine, 0.5% by mass; triethylene glycol monobutyl ether, 2.0% by mass; OLFINE E1010, 1.0% by mass; pigment dispersion, 40.0% by mass; purified water, balance. The pigment dispersion was S170 (carbon black, Degussa; solids concentration, 15%).

The measuring instrument was Otsuka Electronics Co., Ltd.'s ELSZ-1000 particle size analyzer.

Equal volumes of the freshly prepared pigment ink P1 and the ink composition of the Example or Comparative Example (before water evaporation in the water evaporation test) were mixed together, the mixture was put into a quartz cell, and the cell was subjected to the measurement of particle diameter. Water in the pigment ink P1 was allowed to evaporate in the same way as in the water evaporation test on Examples 1 to 11 and Comparative Examples 1 and 2. Equal volumes of the pigment ink P1 that completed water evaporation and the ink composition of the Example or Comparative Example that completed water evaporation were mixed together, the mixture was put into a quartz cell, and the cell was subjected to the measurement of particle diameter. For Examples 1 to 11, Comparative Examples 1 and 2, and the pigment ink P1, the removal of the ink composition after water evaporation was from the ink encasement. For Comparative Example 3, it was from the tube. The percentage change in particle diameter from before to after the water evaporation test was calculated for each Example or Comparative Example. Accumulation was graded according to the criteria below. The results are presented in Table 1.

A: The percentage change in particle diameter is less than 200%.

B: The percentage change in particle diameter is 200% or more and less than 300%.

C: The percentage change in particle diameter is 300% or more.

3.3. Test Results

The Examples were ink jet recording apparatuses that included an ink composition, an ink encasement in which the ink composition was encased, a recording head that was to eject the ink composition, and a carriage configured to move the recording head back and forth. The ink composition contained a water-soluble dye and a polyhydric alcohol with a normal boiling point of 270° C. or above, with the percentage of the polyhydric alcohols being 26.0% by mass or less of the total amount of the ink composition. The carriage carried the ink encasement, with the ink encasement integrated with the carriage. The ink encasement had an ink fill port that opens and shuts as a port through which the ink composition was to be loaded. As shown in Table 1, in the Examples, the evaporation of water from the ink composition was limited, and the viscosity of the ink composition was low. Although the viscosity (initial) grade in Example 9 was "C," the measured viscosity was less than 2.9 mm²/cm, indicating the ink composition was of sufficiently low viscosity.

Overall, an ink jet recording apparatus according to an aspect of the present disclosure has an ink encasement that has an ink fill port that opens and shuts. A carriage in the apparatus carries the ink encasement, with the ink encasement integrated with the carriage. The percentage of polyhydric alcohols with a normal boiling point of 270° C. or above, which provide water retention, can therefore be low. As a result, the ink jet recording apparatus achieves high ejection stability.

The present disclosure is not limited to the above embodiments, and many variations are possible. For example, the present disclosure embraces configurations substantially identical to those described in the embodiments (e.g., configurations identical in function, methodology, and results to or having the same goal and offering the same advantages as the described ones). The present disclosure also includes configurations created by changing any nonessential part of those described in the above embodiments. Furthermore, the present disclosure encompasses configurations identical in operation and effect to or capable of fulfilling the same purposes as those described in the above embodiments. Configurations obtained by adding any known technology to those described in the embodiments are also part of the present disclosure.

What is claimed is:

1. An ink jet recording apparatus comprising:
    an ink composition;
    an ink encasement in which the ink composition is encased;
    a recording head that ejects the ink composition; and
    a carriage configured to move the recording head back and forth, wherein:
    the carriage carries the ink encasement, with the ink encasement integrated with the carriage;
    the ink encasement has an ink fill port that opens and shuts as a port through which the ink composition is loaded;
    the ink composition contains a water-soluble dye; and the ink composition contains a polyhydric alcohol with a normal boiling point of 270° C. or above, with a percentage thereof being 26.0% by mass or less of a total amount of the ink composition.

2. The ink jet recording apparatus according to claim 1, wherein
the percentage of the polyhydric alcohol with a normal boiling point of 270° C. or above to the total amount of the ink composition is 1.0% by mass or more.

3. The ink jet recording apparatus according to claim 1, wherein
the ink composition further contains a polyoxyalkylene alkyl ether compound.

4. The ink jet recording apparatus according to claim 1, wherein:
the ink encasement has a filter; and
the ink composition passes through the filter against force of gravity when flowing from the ink encasement to the recording head.

5. The ink jet recording apparatus according to claim 1, wherein:
the carriage further carries a disperse-colorant ink encasement, in which a disperse-colorant ink composition is encased, as an extra ink encasement; and
the recording head ejects the disperse-colorant ink composition and the ink composition.

6. An ink jet recording method in which an ink jet recording apparatus is used that includes:
an ink composition;
an ink encasement in which the ink composition is encased;
a recording head that ejects the ink composition; and
a carriage configured to move the recording head back and forth,
the carriage carrying the ink encasement, with the ink encasement integrated with the carriage,
the ink encasement having an ink fill port that opens and shuts as a port through which the ink composition is loaded,
the ink composition containing a water-soluble dye, and
the ink composition containing a polyhydric alcohol with a normal boiling point of 270° C. or above, with a percentage thereof being 26.0% by mass or less of a total amount of the ink composition,
the method comprising ejecting the ink composition from the recording head to attach the ink composition to a recording medium.

7. An ink composition comprising:
a water-soluble dye; and
a polyhydric alcohol with a normal boiling point of 270° C. or above, with a percentage of the polyhydric alcohol being 26.0% by mass or less of a total amount of the ink composition,
the ink composition being for use with an ink jet recording apparatus that includes:
the ink composition;
an ink encasement in which the ink composition is encased;
a recording head that ejects the ink composition; and
a carriage configured to move the recording head back and forth,
the carriage carrying the ink encasement, with the ink encasement integrated with the carriage, and
the ink encasement having an ink fill port that opens and shuts as a port through which the ink composition is loaded.

* * * * *